United States Patent
Kirrbach

(10) Patent No.: US 12,212,368 B2
(45) Date of Patent: Jan. 28, 2025

(54) OPTICAL WIRELESS APPARATUS AND METHOD FOR CREATING INFORMATION MEMORIES

(71) Applicant: Fraunhofer-Gesellschaft zur Foerderung der angewandten Forschung e.V., Munich (DE)

(72) Inventor: René Kirrbach, Dresden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 92 days.

(21) Appl. No.: 17/674,657

(22) Filed: Feb. 17, 2022

(65) Prior Publication Data

US 2022/0271845 A1 Aug. 25, 2022

(30) Foreign Application Priority Data

Feb. 22, 2021 (DE) .......................... 102021201665.0

(51) Int. Cl.
  *H04B 10/64* (2013.01)
  *H04B 10/58* (2013.01)
  *H04B 10/61* (2013.01)

(52) U.S. Cl.
  CPC ............. *H04B 10/64* (2013.01); *H04B 10/58* (2013.01); *H04B 10/6163* (2013.01)

(58) Field of Classification Search
  CPC ..... H04B 10/64; H04B 10/58; H04B 10/6163
  (Continued)

(56) References Cited

U.S. PATENT DOCUMENTS 10,819,427 B2 * 10/2020 Chen .................... H04B 17/336
2004/0005014 A1 * 1/2004 Talwar .................. H04W 52/52
  375/295

(Continued)

FOREIGN PATENT DOCUMENTS

CN  1397114 A  2/2003
CN  1717949 A  1/2006
(Continued)

OTHER PUBLICATIONS

Jaruwatanadilok, Sermsak, et al., "Modeling the Point-to-point wireless communication channel under the adverse weather conditions", IEICE transactions on electronics, Tokyo, JP, E87-C, No. 9, XP 001209713, ISSN 0916-8524, pp. 1455-1462, Sep. 2004.

(Continued)

*Primary Examiner* — Amritbir K Sandhu
(74) *Attorney, Agent, or Firm* — Perkins Coie LLP; Michael A. Glenn

(57) ABSTRACT

An optical wireless apparatus that is implemented for transmitting an optical wireless signal via an optical wireless channel includes: an electronic signal source that is configured to provide a data signal and an optical signal source that is configured to convert the data signal into the optical wireless and to emit the same. The optical wireless apparatus is configured to obtain channel information including information associated with a non-linear channel distortion of the optical wireless signal and to perform adaptation of a modulation of the optical signal source by changing an operating state of the electronic signal source for adapting the non-linear channel distortion and/or to perform adaptation of an operating point of the optical signal source for adapting the non-linear channel distortion.

37 Claims, 20 Drawing Sheets

(58) Field of Classification Search
USPC .......................................................... 398/131
See application file for complete search history.

(56) References Cited

U.S. PATENT DOCUMENTS

| | | | | |
|---|---|---|---|---|
| 2009/0074419 | A1* | 3/2009 | Pappert | H04B 10/58 398/91 |
| 2011/0033182 | A1* | 2/2011 | Haunstein | H04B 10/6161 398/26 |
| 2017/0104544 | A1* | 4/2017 | Chung | H04B 10/25133 |
| 2020/0136661 | A1 | 4/2020 | Eliaz et al. | |
| 2022/0271845 | A1* | 8/2022 | Kirrbach | H04B 10/64 |

FOREIGN PATENT DOCUMENTS

| | | | | |
|---|---|---|---|---|
| JP | H05335664 | A * | 12/1993 | |
| JP | 3602157 | B2 * | 12/2004 | ........... H03F 1/3276 |
| JP | 3650377 | B2 * | 5/2005 | ......... H04B 10/6932 |
| WO | WO-9528777 | A1 * | 10/1995 | ......... H04B 10/1143 |
| WO | 0245303 | A1 | 6/2002 | |

OTHER PUBLICATIONS

Chun, Hyunchae, et al., "Visible Light Communication using Laser Diode based Remote Phosphor Technique", In: 2015 IEEE International Conference on Communication Workshop (ICCW), IEEE, 2015;http://dx.doi.org/10.1109/ICCW.2015.7247373, pp. 1392-1397.

Elgala, Hany, et al., "A Study of LED Nonlinearity Effects on Optical Wireless Transmission using OFDM", 2009 IFIP International Conference on Wireless and Optical Communications Networks; IEEE; 2009., pp. 1-5.

Hong, Yang, et al., "On the Performance of Adaptive MIMO-OFDM Indoor Visible Light Communications", In: IEEE Photonics Technology Letters 28 (2016); Nr. 8; 4 pp.http://dx.doi.org/10.1109/LPT.2016.2517192, pp. 907-910.

Huang, Xingxing, et al., "[Uploaded in 3 parts] 1.6 Gbit/s phosphorescent white LED based VLC transmission using a cascaded pre-equalization circuit and a differential outputs PIN receiver", In: Opt. Express 23 (2015), Aug., Nr. 17; 9 pp.http://dx.doi.org/10.1364/OE.23.022034, pp. 22034-22039.

Khalid, A.M, et al., "1-GB/s Transmission Over a Phosphorescent White LED by Using Rate-Adaptive Discrete Multitone Modulation", In: IEEE Photonics Journal 4 (2012), Nr. 5., pp. 1465-1473 (+ cover page).

Ying, Kai, et al., "Nonlinear distortion mitigation in visible light communications", In: IEEE Wireless Communications 22 (2015), Nr. 2; pp. 36-45.

* cited by examiner

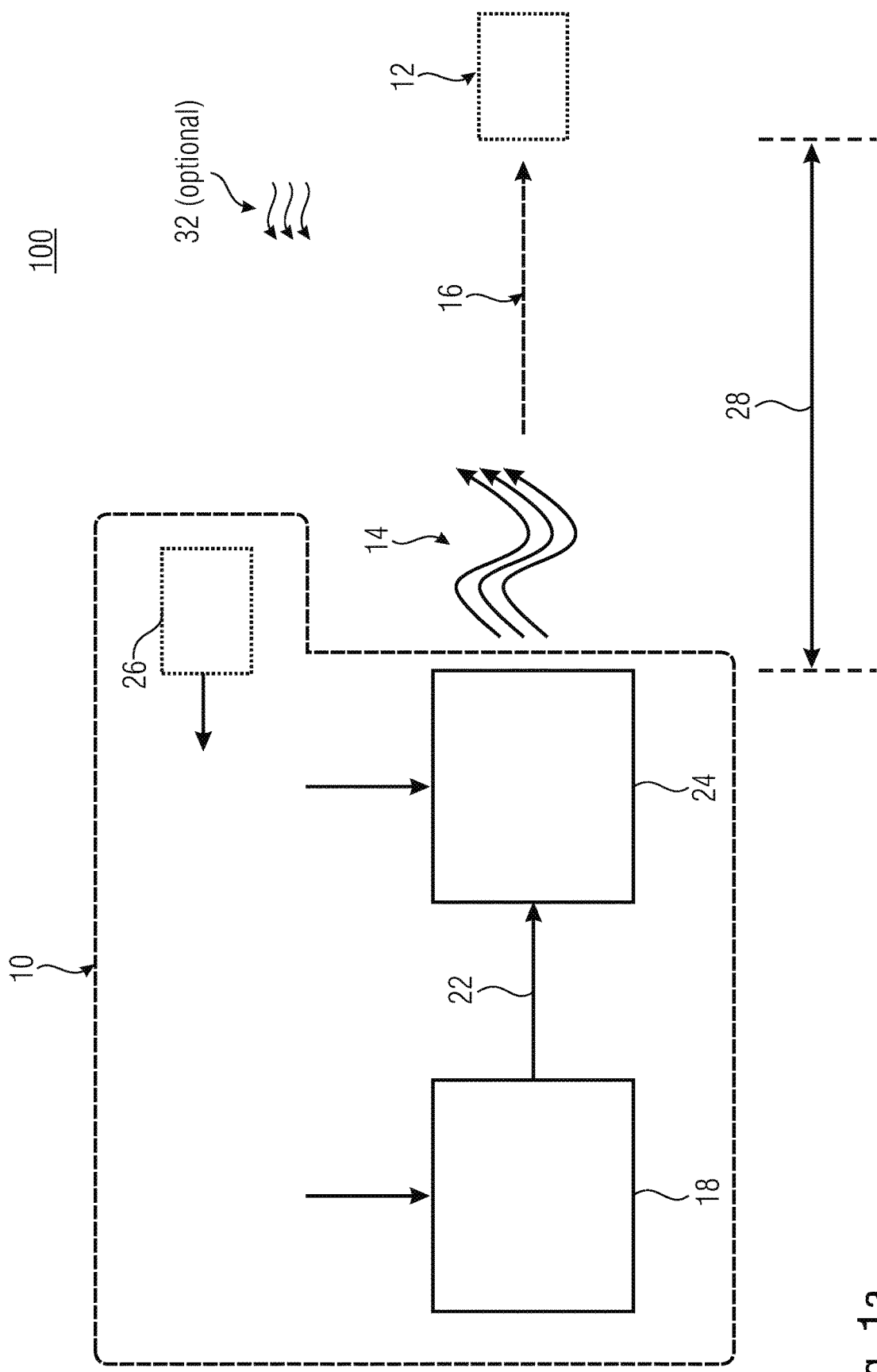

| distance modulation | 0.15 m | 0.4 m | 1 m | 2 m | 4 m | 6 m | 8 m | 10 m |
|---|---|---|---|---|---|---|---|---|
| 9.3 dBm | 607 | 1233 | 783 | 367 | 0 | 0 | 0 | 0 |
| 13.7 dBm | 125 | 1112 | 1112 | 593 | 83 | 0 | 0 | 0 |
| 17.2 dBm | 0 | 382 | 770 | 704 | 413 | 208 | 56 | 0 |
| 22 dBm | 0 | 60 | 162 | 162 | 162 | 158 | 113 | 74 |

Fig. 12a

| distance | 0.15 m | 0.4 m | 1 m | 2 m | 4 m | 6 m | 8 m | 10 m |
|---|---|---|---|---|---|---|---|---|
| measurement quantity (e.g. received power) | 10.4 dBm | 2.3 dBm | −5.1 dBm | −11.0 dBm | −17.0 dBm | −20.0 dBm | −22.6 dBm | −24.3 dBm |
| control quantity amplified from measurement quantity | 5 V | 4 V | 3 V | 2 V | 1.5 V | 1.2 V | 1 V | 0.74 V |

Fig. 12b

| control quantity | 5 V | 4 V | 3 V | 2 V | 1.5 V | 1.2 V | 1 V | 0.74 V |
|---|---|---|---|---|---|---|---|---|
| modulation / dBm | 9.3 dBm | 9.3 dBm | 13.7 dBm | 17.2 dBm | 17.2 dBm | 17.2 dBm | 22 dBm | 22 dBm |

Fig. 12c

OPTICAL WIRELESS APPARATUS AND METHOD FOR CREATING INFORMATION MEMORIES

CROSS-REFERENCE TO RELATED APPLICATIONS

This application claims priority from German Patent Application No. 102021201665.0, which was filed on Feb. 22, 2021, and is incorporated herein in its entirety by reference.

The present invention relates to an optical wireless apparatus, to an optical wireless network, a method for creating an information memory for an optical wireless apparatus and to a method for creating an information memory for an optical wireless apparatus. Further, the present invention relates to an adaptive transmitter for optical wireless communication for analogously modulated signals.

BACKGROUND OF THE INVENTION

Modern optical wireless transceivers use orthogonal frequency division multiplex (OFDM) to achieve high data rates and to ensure high robustness to multipath propagation. Here, OFDM is frequently combined with adaptive bit loading. When the receive signal and hence the carrier-to-noise ratio (CNR) is high, for example because the transmission distance is low, more bits per carrier can be encoded. The product of symbol rate and the sum of encoded bits of all carriers corresponds to the data rate. The data rate can be maximized by increasing the symbol rate and/or a CNR. A higher symbol rate needs a higher bandwidth. However, the same is limited by the optical emitters such as light emitting diodes (LEDs); laser or laser diodes. The CNR again is reduced by noise as a consequence of non-linear distortions. Normally, the optical emitter (for example LED), is the component having the strongest non-linear distortions. For reducing these distortions and for obtaining peak data rates that are as high as possible, the modulation or level control, i.e., the signal amplitude at the transmitter is reduced. However, this reduces the signal power and hence the range or the coverages of the optical wireless data connection.

In literature, nowadays, a modulation representing a tradeoff between data rate and range is selected. As the non-linear distortions and the range depend in a non-linear manner on the modulation, there is a modulation where the range becomes maximum for a defined data rate. [a][b][c]

Other approaches include, for example, non-linear pre-distortion or post-distortion of the signal to compensate the non-linearity [d]. However, these approaches are complex in dimensioning and production.

There is a need for higher data transmission rate in optical wireless transmissions allowing reliable data transmission.

Accordingly, transmitters for optical wireless communication that can provide both a high data rate as well as a high range would be desirable.

SUMMARY

According to an embodiment, an optical wireless apparatus implemented for transmitting an optical wireless signal via an optical wireless channel may have: an electronic signal source that is configured to provide a data signal; and an optical signal source that is configured to convert the data signal into the optical wireless and to emit the same; wherein the optical wireless apparatus is configured to obtain channel information including information associated with a non-linear channel distortion of the optical wireless signal in the optical wireless channel and to perform adaptation of a modulation of the optical signal source by changing an operating state of the electronic signal source for adapting the non-linear channel distortion and/or to perform adaptation of an operating point of the optical signal source for adapting the non-linear channel distortion.

Another embodiment may have an optical wireless network with an inventive optical wireless apparatus and a receiver for receiving the optical wireless signal.

According to another embodiment, a method for creating an information memory for an optical wireless apparatus to allow the adaptation of a modulation of an optical signal source may have the steps of: arranging a transmitter and a receiver for transmitting an optical wireless signal via an optical wireless channel, repeatedly transmitting an optical wireless signal for different distances between transmitter and receiver, such that a plurality of modulations are used for transmitting at each distance, determining at least one obtainable data rate and/or a noise ratio at the location of the receiver for each of the transmitted signals, determining a modulation to be selected for each of the distances by using which a data rate or the noise ratio is at a maximum, compiling the modulations to be selected for the different distances.

According to another embodiment, a method for creating an information memory for an optical wireless apparatus to allow the adaptation of an operating point of an optical signal source may have the steps of: arranging a transmitter and a receiver for transmitting an optical wireless signal via an optical wireless channel, repeatedly transmitting an optical wireless signal for different distances between the transmitter and the receiver, such that a plurality of operating points are used for transmitting at each distance, determining at least one obtainable data rate and/or a noise ratio at the location of the receiver for each of the transmitted signals, determining an operating point to be selected for each of the distances by using which a data rate or the noise ratio is at a maximum, compiling the operating points to be selected for the different distances.

Another embodiment may have a non-transitory digital storage medium having a computer program stored thereon to perform any of the inventive methods when said computer program is run by a computer.

It is a core idea of the present invention to effect, by adapting an operating point of an optical signal source and/or by changing an operating state of an electronic signal source of an optical wireless apparatus, e.g. an adaptation or compensation or reduction of a non-linear channel distortion to obtain an optimum tradeoff between data rate and range, so that both parameters can be optimized at all times.

According to an embodiment, an optical wireless apparatus implemented for transmitting an optical wireless signal via an optical wireless channel includes an electronic signal source that is configured to provide a data signal. Further, the optical wireless apparatus includes an optical signal source that is configured to convert the data signal into the optical wireless signal and to emit the same. The optical wireless apparatus is configured to obtain channel information including information associated with a non-linear channel distortion of the optical wireless channel and is implemented to perform adaptation of a modulation of the optical signal source by changing an operating state of the electronic signal source for adapting the non-linear channel distortion and/or to perform adaptation of an operating point of the optical signal source for adapting the non-linear channel distortion.

According to an embodiment, the adaptation of the non-linear channel distortion depends on the current transmitter-receiver arrangement or the current channel attenuation.

According to an embodiment, an optical wireless network includes at least one such optical wireless apparatus and additionally a receiver for receiving the optical wireless signal.

According to an embodiment, a method for creating an information memory for an optical wireless apparatus includes arranging a transmitter and a receiver for transmitting an optical wireless signal via an optical wireless channel to allow the adaptation of a modulation of an optical signal source. The method includes repeatedly transmitting an optical wireless signal for different distances between the transmitter and the receiver, such that a plurality of modulations are used for the transmission at each distance, which allows finding ideal modulation for the present channel attenuations. The method includes determining at least one obtainable data rate and/or noise ratio at the location of the receiver for each of the transmitted signals as well as determining a modulation to be selected for each of the distances by using which a data rate or the noise ratio is at a maximum. The method includes compiling the modulations to be selected for the different distances. Knowing the settings for modulation for obtaining the maximum data rate or the maximum noise ratio at a respective channel attenuation, the modulations can be adapted during operation when the respective event occurs, such that the data rate or the noise ratio is still at a maximum.

According to an embodiment, a method for creating an information memory for an optical wireless apparatus includes arranging a transmitter and a receiver for transmitting an optical wireless signal via an optical wireless channel to allow the adaptation of an operating point of an optical signal source. The method includes repeatedly transmitting an optical wireless signal for different distances between the transmitter and the receiver, such that a plurality of operating points are used for transmitting at each distance. The method includes determining an obtainable data rate and/or noise ratio at the location of the receiver for each of the transmitted signals as well as determining an operating point to be selected for each of the distances by using which a data rate or a noise ratio is at a maximum. Further, the method includes compiling the operating points to be selected for the different distances. The method for collecting data for adapting the operating point can hence be performed in a similar manner as the method for collecting information for modulating an optical signal source.

Further embodiments relate to a computer program or a data memory on which such a computer program for performing methods described herein is stored.

BRIEF DESCRIPTION OF THE DRAWINGS

Embodiments of the present invention will be detailed subsequently referring to the appended drawings, in which:

FIG. 1a is a schematic block diagram of an optical wireless network with an optical wireless apparatus according to an embodiment;

FIG. 11 shows again some of the curves of FIG. 2a;

FIG. 12a-c are each an exemplary table for explaining how values to be adjusted at an optical wireless apparatus are obtained according to an embodiment, wherein the tables are linked to one another by the respective characteristics;

DETAILED DESCRIPTION OF THE INVENTION

Figure 1B:
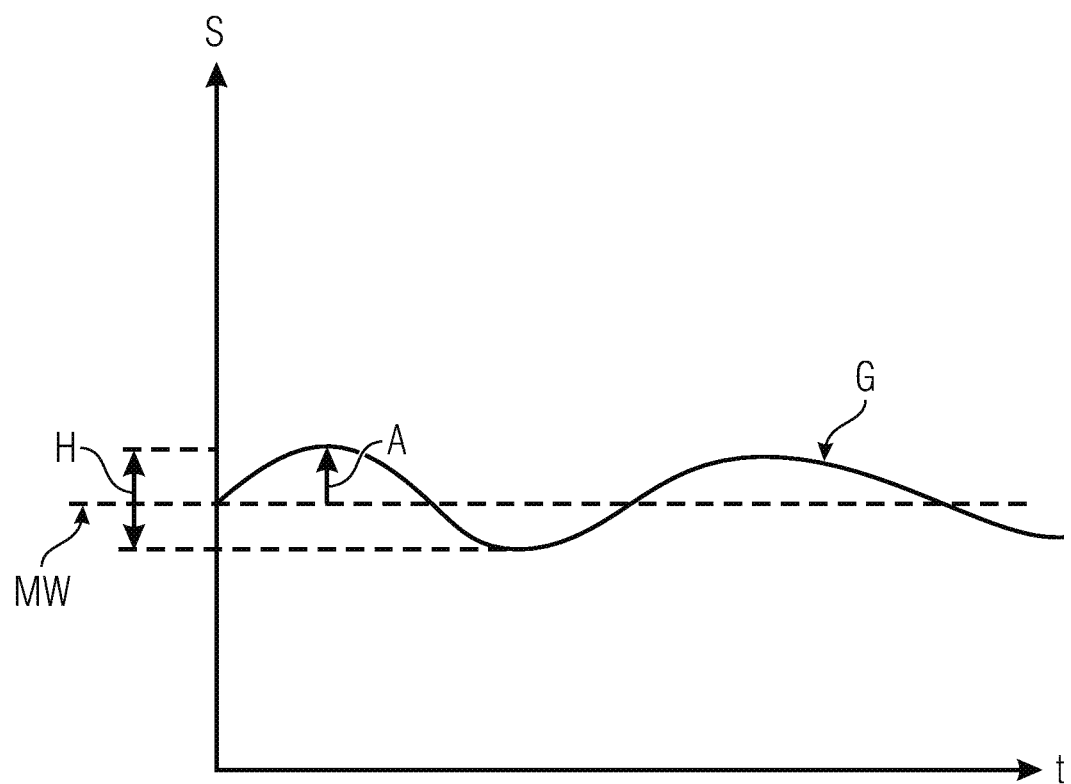
FIG. 1b is an exemplary schematic illustration of a graph for explaining the modulation of an optical signal source in correspondence with embodiments.

Before embodiments of the present invention will be discussed in more detail below based on the drawings, it should be noted that identical, functionally equal or equal elements, objects and/or structures are provided with the same reference numbers in the different figures, such that the description of these elements illustrated in different embodiments is inter-exchangeable or inter-applicable.

Embodiments described below are described in the context of a plurality of details. However, embodiments can also be implemented without these detailed features. Further, for clarity reasons, the embodiments are described by using block diagrams as a substitute for a detailed illustration. Further, details and/or features of individual embodiments can easily be combined with one another as long as it is not explicitly described otherwise.

Some of the embodiments herein are discussed in the context of optical wireless communication, for which also the term LiFi (light fidelity) is used. According to embodiments that will be explained below, the same is combined with the generation of quantum keys, i.e., cryptographic keys, which are generated by using quantum-based approaches. The advantages obtained thereby can also be used in other areas of wireless communication such that the described embodiments are not limited to optical wireless communication but can also be used in other areas of wireless communication, such as in the area of radio wave communication in the frequency range from approximately 800 MHz onwards, wherein in particular frequencies and technologies for beamforming are suitable, as it is possible, for example, in the frequency band from 4 GHz onwards, but also at higher frequencies of at least 40 GHz, for example, in the range of approximately 50 GHz or 60 GHz. Although means for active direct radio transmission, i.e., beamforming, are advantageous, mechanical means such as antenna housings can also be used for beamforming.

Thus, according to embodiments of the present invention, both as an alternative or in addition to optical wireless communication, radio wavelengths can be used, in particular those that are particularly well suited for radio relay transmission, such as by using so-called beamforming technologies. This is particularly advantageous for transmitters that result in essentially non-linear distortions or contribute significantly to the overall non-linearity as in the case of the optical emitter, but also for other non-linear transmitters, for example in non-linear antenna characteristics of radio wave transmitters.

The following embodiments relate to optical wireless signal transmission or data transmission. Within the embodiments described herein, the same is also referred to as LiFi (light fidelity). Here, the term LiFi relates also to terms such as IrDA (infrared data association) or OWC (optical wireless communication). This means the terms optical wireless data transmission and LiFi are used synonymously. Here, optical wireless data transmission means the transmission of an electromagnetic signal through a free transmission medium, such as air or a different gas or a fluid. For this, for example, wavelengths in an ultraviolet (UV) range with at least 53 nm and the infrared range, for example, at most 1550 nm can be used, wherein other wavelengths are also possible that differ from the wavelengths used for radio standards. Optical wireless data transmission also has to be distinguished from fiber-based optical data transmission that is implemented, for example, by means of optical waveguides or optical waveguide cables.

FIG. 1a shows a schematic block diagram of an optical wireless network 100 with an optical wireless apparatus 10 according to an embodiment and a receiver or receiver apparatus 12 implemented for receiving a signal 14 emitted by the optical wireless apparatus 10. The optical wireless apparatus 10 can be implemented for transmitting the optical wireless signal 14 and can be operated as optical wireless transmitter. Without limitations, the optical wireless apparatus can also be implemented for receiving optical wireless signals and can be, for example, an optical wireless transceiver. Also, the receiver apparatus 12 can be configured to transmit an optical wireless signal back to the optical wireless apparatus 10, i.e., be formed as transceiver. A channel 16 between the optical wireless apparatus 10 and the receiver 12 can thus be used unidirectionally or also bidirectionally. The channel 16 can result in a channel-induced distortion of the optical wireless signal 14, i.e., can provide a channel distortion. The same can particularly be non-linear and can have, for example, a different effect for different frequency ranges or wavelength ranges.

The optical wireless apparatus 10 includes an electronic signal source 18 that is configured to provide a data signal 22. Further, the optical wireless apparatus 10 includes an optical signal source 24 that is configured to convert the data signal 22 into the optical wireless signal 14 and to emit the same. The optical signal source 24 can comprise an optical emitter, such as a laser source or a light emitting diode, wherein a light emitting diode is advantageous. An operating point of the optical emitter can correspond to a direct component of the current consumption of the optical emitter 24.

The electronic signal source 18 and the optical signal source 24 can be coupled directly or can even form an integrated device. However, this does not exclude intermediate processing of the electronic data signal, for example, by using a filter, amplifier or the same.

The optical wireless apparatus 10 is configured to obtain channel information 26 comprising information associated with a non-linear distortion of the signal 14 in the optical wireless channel 16. Here, the channel information 26 can indicate, for example, information that accompanies a distance 28 between the receiver 12 and the optical wireless apparatus 10 or directly indicates the same, wherein, for example, a continuous or discrete range of values is possible. Alternatively or additionally, the channel information 26 can also correlate with a noise ratio or can indicate the same, wherein the noise ratio can relate to a receiving quality of the optical wireless signal 14 at the location of the receiver 12. Such information can be obtained or received by the receiver 12 but can also be estimated by the receiver 12 by using the assumption of the channel reciprocity in that the receiver 12 receives an optical wireless signal, wherein it is possible but not necessary to use the same wavelength range as for the optical wireless signal 14.

The optical wireless apparatus 10 is configured to perform adaptation of a modulation of the optical signal source 24 based on the channel information to at least partly perform adaptation of the non-linear channel distortion. For this, the optical wireless apparatus 10 can change the operating state of the electronic signal source, for example by changing the modulation of a digital signal processor (DSP) and/or by adapting a gain of a driver of the electronic signal source 18. Further means are also possible. As an alternative or in addition to the adaptation of the operating state of the electronic signal source 18, adaptation of an operating point of the optical signal source 24 can be performed by the optical wireless apparatus to adapt the modulation of the optical signal source.

The adaptation can be performed, for example, at least as partial compensation of the non-linear channel distortion, i.e., to counteract the present or specified or current non-linear channel distortion. Non-linear pre-distortions and/or post-distortions can be used, which can improve the linearity, which can be considered as compensation. Embodiments relate to selecting the operating state of the transmitter such that the present non-linear distortions no longer interfere, which can also mean accepting strong distortions, for example at large distances. Adaptation in connection with embodiments can have the aim of improving the signal quality/data rate. This can also be considered as reduction, except be for cases where the modulation is increased or the operating point is decreased.

Changing the operating state of the electronic signal source 18 and/or adapting the operating point of the optical signal source 24 can be performed by respective control means (not illustrated) that evaluates the channel information 26 and derives the parameters to be adjusted for the electronic signal source 18 or the optical signal source 24. For this, for example, an information memory can be provided that directly indicates the parameters to be adjusted or that has stored a calculation rule from which the parameters to be adjusted can be derived by using the channel information 26.

According to the embodiment, the channel information 26 can be based on a noise ratio, such as a signal-to-noise ratio (SNR) and/or a carrier-to-noise ratio (CNR). The noise ratio can relate to the optical wireless signal 14 and the channel information 26 can further be based on a signal power of the optical wireless signal at the receiver 12, such as a power spectral density (PSD) or a direct component of the photocurrent at the anode or cathode of a photodiode of the receiver 12. These values also depend on the distance 28, such that the noise ratio and/or the signal power at the location of the receiver 12 can be inferred from the distance 28, at least by considering the values adjusted in the optical wireless apparatus 10.

The optical wireless apparatus 10 can be configured to adapt the adaptation of the modulation of the optical signal source 24 during operation, this means adjusting different adjustments for the modulation of the optical signal source at different times, such as when determining a change of the optical wireless channel 16. According to an embodiment, the optical wireless signal 14 is a first optical wireless signal emitted in a first transmission interval. In a later second transmission interval, a later second optical wireless signal is emitted by the apparatus 10, such as by using the optical signal source 24. The optical wireless apparatus 10 is configured to determine, for transmitting this later optical wireless signal in the later second transmission interval, that a channel attenuation has increased compared to the first transmission interval and to increase the modulation and/or to reduce the operating point to benefit from a larger signal modulation/signal power or to reduce the power dissipation, wherein greater non-linear distortions are accepted, which are, however, of no importance with respect to data rate/error rate. Alternatively or additionally, the optical wireless apparatus can be configured to determine, for transmitting the later signal, that a channel attenuation is reduced compared to the first transmission interval and to reduce the modulation and/or to increase the operating point in order to reduce the non-linear distortions, for example of the electronic signal source. Reducing the modulation can be implemented, for example, by lower power of the electronic signal source 18. Adjusting the operating point will be discussed in detail in connection with embodiments described herein.

Improving or deteriorating the channel, i.e., determining a reduced or increased channel attenuation can be communicated explicitly or implicitly to the optical wireless apparatus 10, for example by communicating a respective value for the noise ratio or the signal power at the receiver 12. Alternatively or additionally, the optical wireless apparatus 10 can estimate respective values from received optical wireless signals, for example, by receiving a signal 32. According to an embodiment, the optical wireless apparatus 10 is configured to estimate a channel attenuation and is configured to estimate the non-linear distortion based on reference information indicating a noise at the receiver 12 of the optical wireless channel 16.

According to an embodiment, the optical wireless apparatus 10 is configured to estimate the channel attenuation based on a signal power at the receiver 12 and a signal power at the transmitter of the optical wireless channel 16, i.e., the optical channel source 24.

According to an embodiment, the optical wireless apparatus 10 comprises an information memory (not shown) and/or a channel estimator (not shown) that is configured to output information indicating a connection between a signal transmitted in the optical wireless channel 16 and the non-linear distortion.

According to an embodiment, the channel information 26 is based at least partly on a feedback of the receiver 12 regarding a signal power of the optical wireless signal 14 at the receiver 12, on a noise ratio of the optical wireless signal 14 at the receiver 12 and/or an error rate. The noise ratio and the error rate are directly related to one another, which is why a relation to the noise ratio simultaneously represents a relation to the error rate. For the feedback, this information can be explicitly stated or can be stated based on other information, such as an index of a lookup table or the same. According to an embodiment, the optical wireless apparatus 10 is configured to transmit the optical wireless signal 14 via the optical wireless channel 16. Optionally, the apparatus 10 can be configured for receiving an optical wireless signal 32, which possibly can be received via the optical wireless channel 16, such as starting from the receiver 12 or another apparatus. The optical wireless apparatus 10 can be configured to perform the channel estimation of the optical wireless channel 16 based on the optical wireless signal 32 to determine a noise ratio of the signal 32.

Alternatively or additionally, the optical wireless apparatus 10 can be configured to receive the channel information 26 from the receiver 12 of the optical wireless signal 14. The optical wireless apparatus 10 can be configured to adapt the modulation of the optical signal source 24 based on a channel information such that the same indicates a received power reduced compared to a previous transmission interval and/or a reduced noise ratio at the receiver of the optical wireless signal, by increasing an alternating component of the electronic signal 22 towards a second alternating component for a later optical wireless signal. Thereby, the operating point of the optical signal source 24 is adapted.

Alternatively or additionally, the optical wireless apparatus 10 can be configured to adapt, for adapting the modulation of the optical signal source 24, an operating state of a driver circuit of the electronic signal source 18 to adapt the modulation of the optical signal source 24. Such a driver circuit can comprise an amplifier element that is configured to amplify a received processor signal or to convert the same to a current. The optical wireless apparatus 10 can be configured to adjust a gain of the amplifier element to change the operating state of the driver circuit to adapt thereby the non-linear distortion at the optical signal source. For example, the driver circuit can include an adaptable attenuation member to adapt the gain of the amplifier element. Alternatively or additionally, an active adaptation of a gain factor of the amplifier element can be adjusted by the driver circuit.

The amplifier element can be coupled to a resistive circuit that adjusts the gain. The optical wireless apparatus 10 can be configured to adjust the gain at least approximately continuously and/or resistances discretely. A continuous change can take place, for example, by using a potentiometer. The resistive circuit can alternatively or additionally comprise a plurality of switching states where different resistances for adjusting the gain are coupled to the amplifier element. The optical wireless apparatus 10 can be configured to select and adjust one of the plurality of switching states for changing the control.

According to an embodiment, the electronic signal source 18 can comprise a signal processor, in particular a digital signal processor, DSP, which is configured to provide a processor signal to the driver circuit. The driver circuit can be configured to control its gain according to the processor signal. The signal processor can be configured to adapt an alternating component of the processor signal by means of a digital-to-analog converter to feed a signal of different strength into the driver circuit.

In other words, embodiments of the present invention describe an optical wireless transmitter addressing the problems of emitter non-linearity by adaptive AC modulation. The AC modulation follows the current channel attenuation that results from geometric channel losses or absorption in the channel. At small distances, the channel losses are low, such that the receive signal is strong. Then, the modulation is reduced, such that the non-linear distortions at the emitter and in the other transmitter components are reduced. As a consequence, a higher CNR and hence a higher peak data rate can be obtained. If the communication distance and hence the channel attenuation is high, the modulation is increased. A higher transmitting power is accompanied by a higher range of the connection. If the control is configured correctly, the data rate across the entire distance also increases. At a greater communication distance, bit loading has the effect that reducing the modulation depth is advantageous. Due to the higher modulation, the non-linear distortions increase but due to the lower modulation depth, a particularly high CNR is possibly not needed. As soon as the noise from the non-linear distortions is exceeded by another noise factor (for example, internal receiver noise), a higher signal modulation increases the signal power more than the noise power increases. As a consequence, the CNR and hence the data rate increases.

FIG. 1b shows an exemplary schematic illustration of a graph having a curve G representing, exemplarily, a signal amplitude S of an optical emitter of an optical signal source, such as the signal source 24 across time t. To vary an average value MW that can describe a direct component, adjusted by a provided current, describing, for example, the operating point, the signal with an alternating component having a range of values H that can be described by an amplitude A can vary. The operating state of the signal source 24 or the range of values H can be changed by varying the value of the average value, which can take place, for example, via an operating point of the optical signal source and/or via a direct component of the electric signal 18 fed into the optical signal source. In addition, changing the range or values H can result in a changed modulation, which can take place, for example, by changing the amplitude of the electronic signal, such as via variable gain factors. Modulation can here mean an amplitude variation that differs from an adaptive operating point. Both together can be summarized by the term operating state.

Figure 2A:
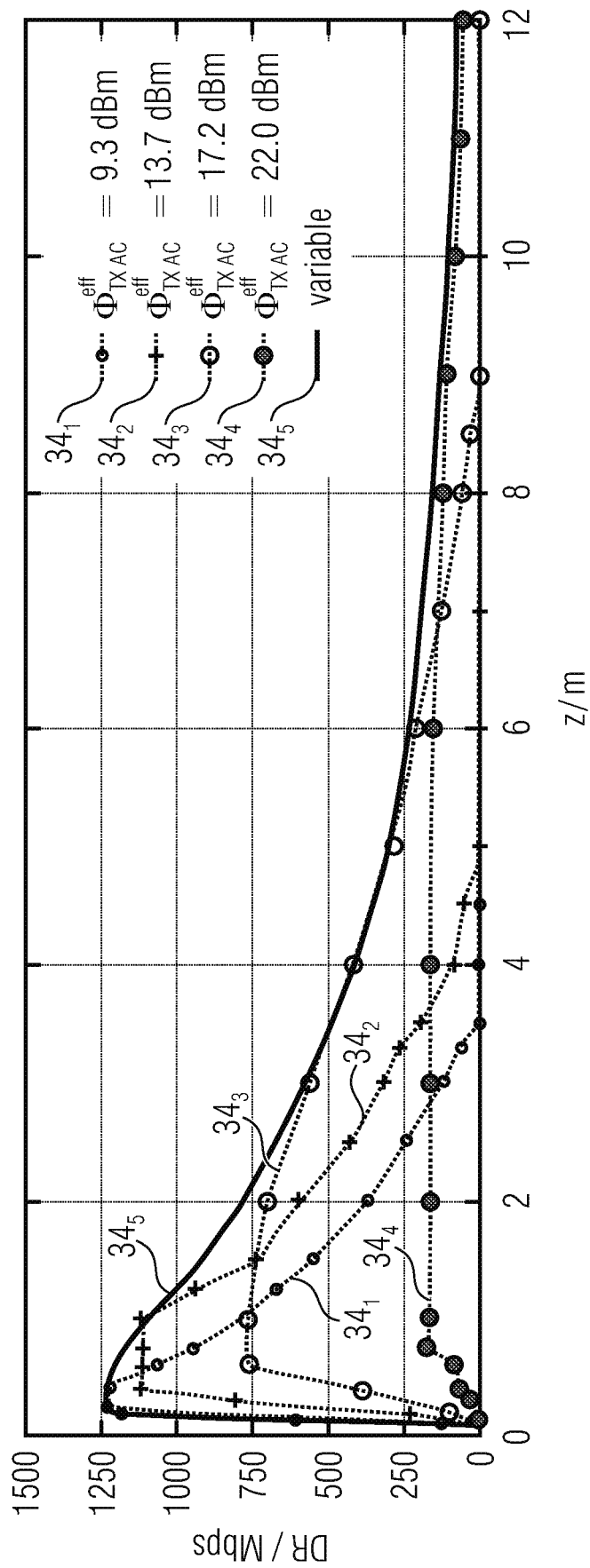
FIG. 2a is a schematic illustration of exemplary graphs for explaining embodiments described, wherein an obtainable data rate is plotted against different distances.

FIG. 2a shows exemplary graphs $34_1$ to $34_5$ for discussing embodiments described herein. On the abscissa, exemplarily, the distance 28 of FIG. 1a is illustrated and indicated by the parameter z in the unit meter (m). On the ordinate, the data rate, DR, is indicated in the unit Mbps that has been obtained in the non-limiting experiment that is represented by the different curves $34_1$ to $34_5$.

The dotted curves show measurement values for different AC transmitter modulations. The values correspond to the effective value of the alternating component of the optical transmitting power. The solid line indicates that an adaptive transmitter obtains the performance of the envelope of all curves. Changing the modulation relates first to the AC signal portion.

Different curves $34_1$ to $34_4$ differ with regard to the adjusted transmitter modulation that relates to the optical signal source 24. For different modulations that are represented by the effective value (eff) of the alternating component (AC) of the optical transmitter (TX) power $\Phi_{TX\ AC}^{eff}$ of 9.3 dBm, 13.7 dBm, 17.2 dBm or 22.0 dBm, different data rates result for different distances z. In the direct comparison of curves $34_1$ to $34_4$, it can be seen, for example, that a low modulation at low distance, which corresponds to a comparatively low channel attenuation can result in higher data rates than larger modulations due to the reduction of non-linear distortions in the transmitter and receiver. For larger distances z, higher modulations offer advantages, as it can be seen, for example, in curves $34_3$ for the distance of 6 meters and the curve $34_4$ for distances of more than 7 meters.

Thus, a variable modulation according to embodiments described herein, represented exemplarily by curve $34_5$, enables a continuously high data rate for different distances, for example for different channel attenuations by considering the non-linear distortions, which is advantageous.

In other words, FIG. 2a shows the data rate of an optical wireless transceiver across the range. The transceiver transmits OFDM signals with adaptive bit loading and thus adapts the data rate to the channel attenuation. Curves for different transmitter modulations are illustrated. $\Phi_{TX\ AC}^{eff}$ encodes the effective value of the alternating component of the optical power. The dotted curves correspond to the configurations, one of which is selected in a conventional approach. High transmitter power $\Phi_{TX\ AC}^{eff}$ (strong modulation) is accompanied by low maximum data rate (due to the non-linear distortions) but high range. At the same time, a lower transmitter power $\Phi_{TX\ AC}^{eff}$ (lower modulation) is accompanied by high maximum data rate but lower range. The adaptive modulation described herein increases the modulation with increasing communication distance z to increase the data rate DR in the distance. If this is achieved, the DR-z-graph of the envelope corresponds to the curves of the individual configurations. It can be clearly seen how the range or the data rate is increased compared to conventional approaches.

Figure 2B:
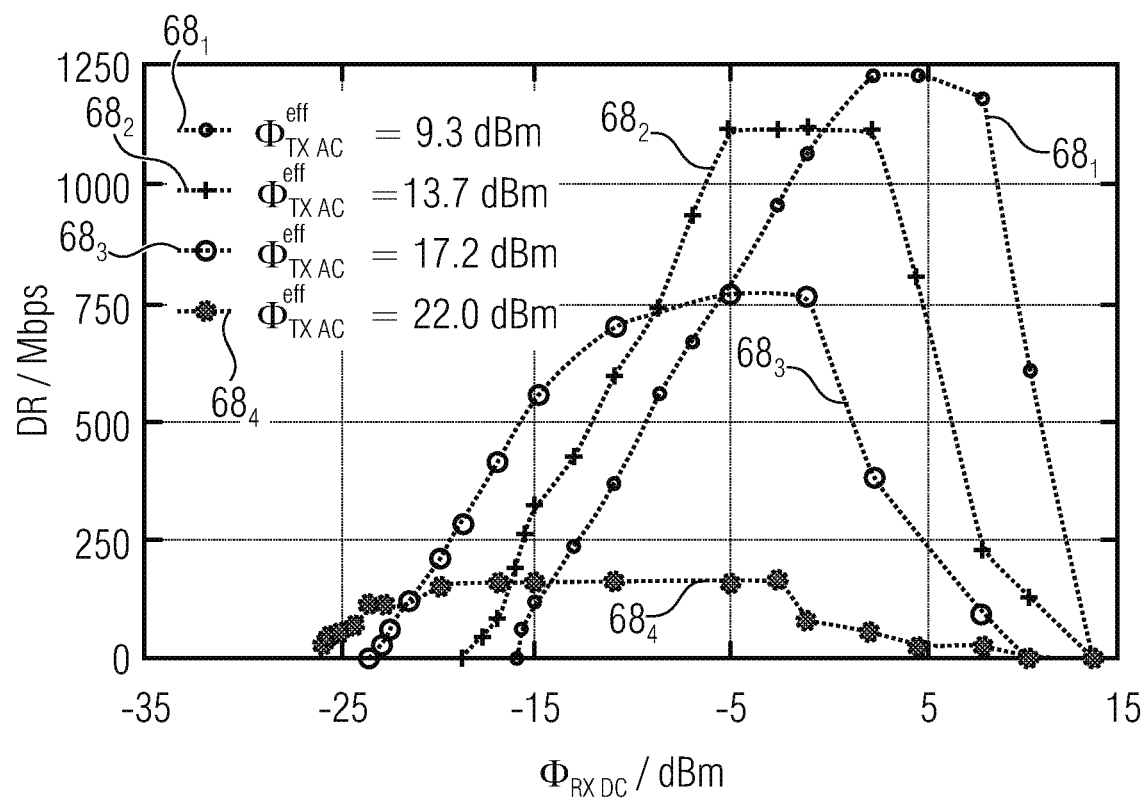
FIG. 2b is an exemplary illustration of different courses of obtainable data rates DR/Mbps for different transmitter modulations and with respect to the direct component of the received power according to an embodiment.

FIG. 2b shows an exemplary illustration of different curves of obtainable data rates DR/Mbps for different transmitter modulations $\Phi_{TX\ AC}^{eff}$ AC and with respect to the direct component of the received power ($\phi_{RX\ DC}$/dBm). In comparison, DR has been plotted in FIG. 2a against the communication distance z.

The different curves $68_1$ to $68_4$ relate to the different effective values of the alternating component of the optical transmitter power $\Phi_{TX\ AC}^{eff}$.

Figure 3:
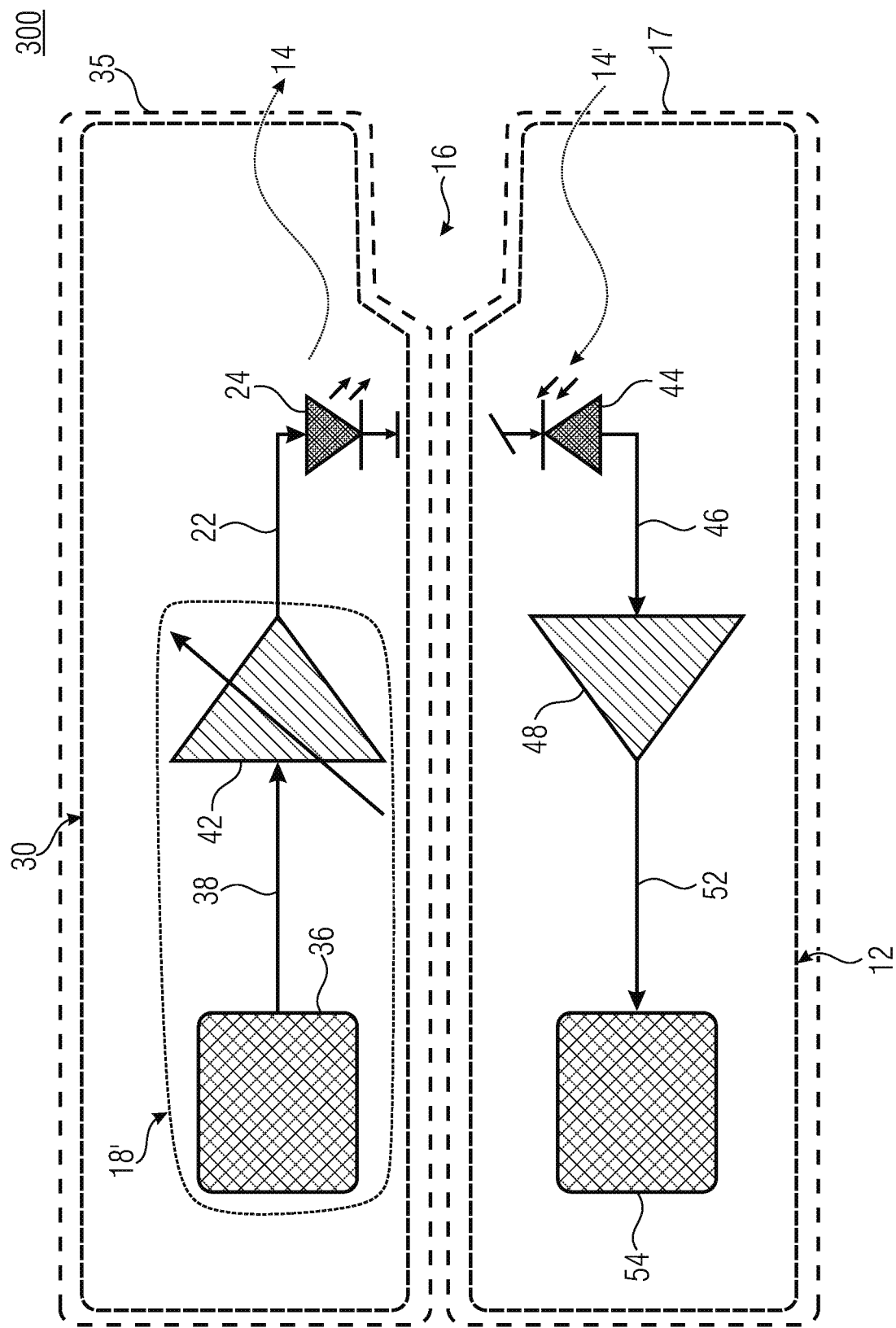
FIG. 3 is a schematic block diagram of an optical wireless network according to an embodiment, wherein the optical wireless apparatus comprises a transmitter.

FIG. 3 shows a schematic block diagram of an optical wireless network 300 according to an embodiment. The optical wireless network includes an optical wireless apparatus 30 according to an embodiment and the receiver 12 that is illustrated in detail compared to FIG. 1a. The receiver 12 can, for example, include a receiver 17 that is implemented for receiving the optical wireless signal 14'.

The apparatus 30 can have the same functions as the apparatus 10. The apparatus 30 can include a transmitter 35 that can include, for example, an electronic signal source 18' and the optical signal source 24. An electronic signal source 18' of the apparatus 30 includes, for example, a signal processor 36 that is configured to output a processor signal 38 and to apply the same to a driver circuit 42, possibly with a variable gain factor to obtain the data signal 22. The optical signal source 24 is implemented to receive the data signal 22 and to emit the optical wireless signal 14. After passing through the channel 16, a distorted signal 14' is received with a photodetector 44 of the receiver 12 that can provide a receive signal based thereon. This receive signal 46 can be supplied to an amplifier 48 of the receiver 12 that can be configured to provide an amplified signal 52, which can be provided to a signal processor, for example, a DSP 54 to process the information emitted by the apparatus 30.

In other words, FIG. 3 shows an optical wireless data transmission path including the transmitter 30 and the receiver 17. The system 300 is illustrated in a simplified unidirectional manner but can also be configured in a bidirectional manner in practice. A digital signal processor 36 (DSP) feeds a modulated data signal 38 into the driver 42 of the optical wireless transmitter 30. In the system 300, the driver is the variable-gain component. In an alternative embodiment, alternatively or additionally, the DSP 36 can provide a variable output level by means of an analog digital converter. It is decisive that a signal 22 is fed into the optical wireless emitter 24 (for example, light emitting diode or laser diode) at the output of the driver 42, whose modulation is variably adjustable. The emitted optical signal is indicated by 14 when the same is emitted and by 14' when the same is incident on a receiver. The photodetector 44 (for example photodiode) detects the signal 14' and converts the same into the receive signal 46. The signal 46 is amplified by an amplifier 48 (for example, transimpedance amplifier). The amplified signal 52 is fed into a DSP 54 where the same is demodulated and processed further. In transceivers for bidirectional data connection, the transmitter 35 and the receiver 17 form a transceiver. In that case, a DSP can unite the functions of block 36 and 54.

Figure 4:
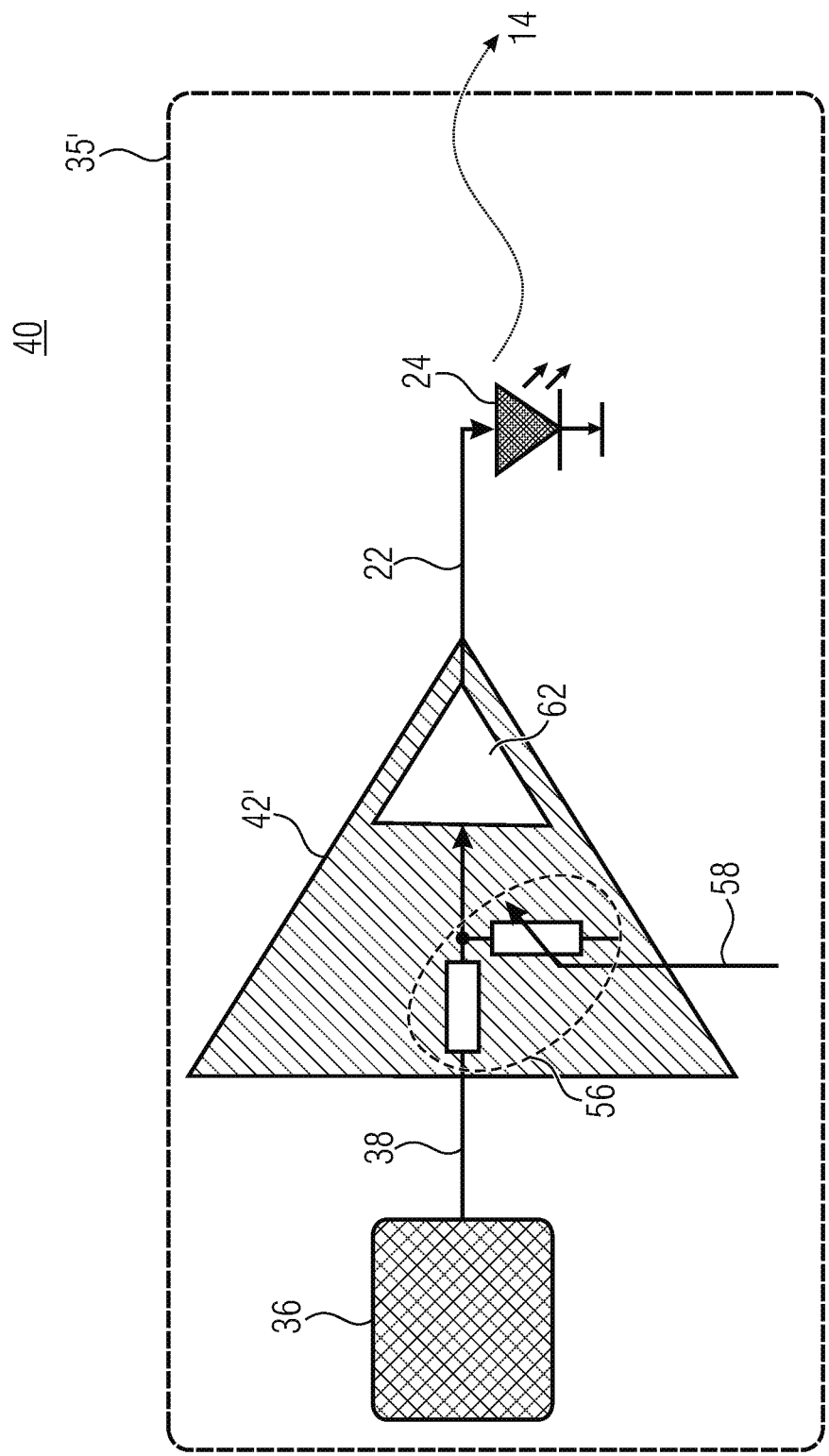
FIG. 4 is a schematic block diagram of part of an apparatus according to an embodiment with a transmitter amended with respect to FIG. 3.

FIG. 4 shows a schematic block diagram of part of an apparatus 40, in particular a transmitter 35' thereof. In the transmitter 35', for example, the concept of changing the operating state of the electronic signal source for adapting the non-linear channel distortion is illustrated. In the embodiment of FIG. 4, for this, an analog realization of a variable gain of the amplifier or the driver circuit 42 is illustrated. Gain control can be performed continuously or gradually. The driver circuit 42 includes an adaptable attenuation member 56 or an attenuation circuit that is configured to adapt the gain of the amplifier element. In FIG. 4, the variable driver gain is realized by means of the variable attenuation member 56 in the driver 42, which can be controlled, for example, via a control signal 58. An output of an amplifier 62, i.e., the data signal 22, can thereby be adapted.

The control signal 58 can be based on at least one of several possible information sources and can transport the respective information as analog signal, such as by means of a signal amplitude, a frequency, an ON OFF level or the same. Alternatively, the control signal 58 can include a message within a communication protocol that carries respective information for controlling the respective element at the apparatus 40 and is, for example, decoded or interpreted. The information source can relate directly or indirectly, i.e., explicitly or implicitly to a measurement quantity that is in connection with the channel or the channel attenuation, for example a distance between transmitter/receiver, a resulting change in a direct component or alternating component of a receive signal or the same. Alternatively, the message can indicate implicitly or explicitly what adjustment has to be performed at the transmitting apparatus.

For adapting the modulation of the optical signal source 24, the channel information can be based on a direct component of an optical wireless signal received by the receiver of the optical wireless channel 16, such as the signal 14 and can be associated to an adaptation of an attenuation member of the electronic signal source at the transmitter, such as the apparatus 40. Alternatively or additionally, for adapting the modulation of the optical signal source 24, the channel information transported by the control signal 58 can be based on an alternating component of an optical wireless signal received by the receiver of the optical wireless channel 16, such as the signal 14 and can be associated to an adaptation of a gain factor of the electronic signal source.

According to embodiments, it is possible but not necessary to provide an information memory in the transmitting apparatus, for example in the form of a lookup table or the same. Different predefined values for the modulation that are associated with different values of the channel distortion can be stored in the information memory. The optical wireless apparatus can be configured to obtain, from the information memory by using the channel information 26, a value to be adjusted for the modulation and to apply the same, for example, a value for the signal 58.

Figure 5:
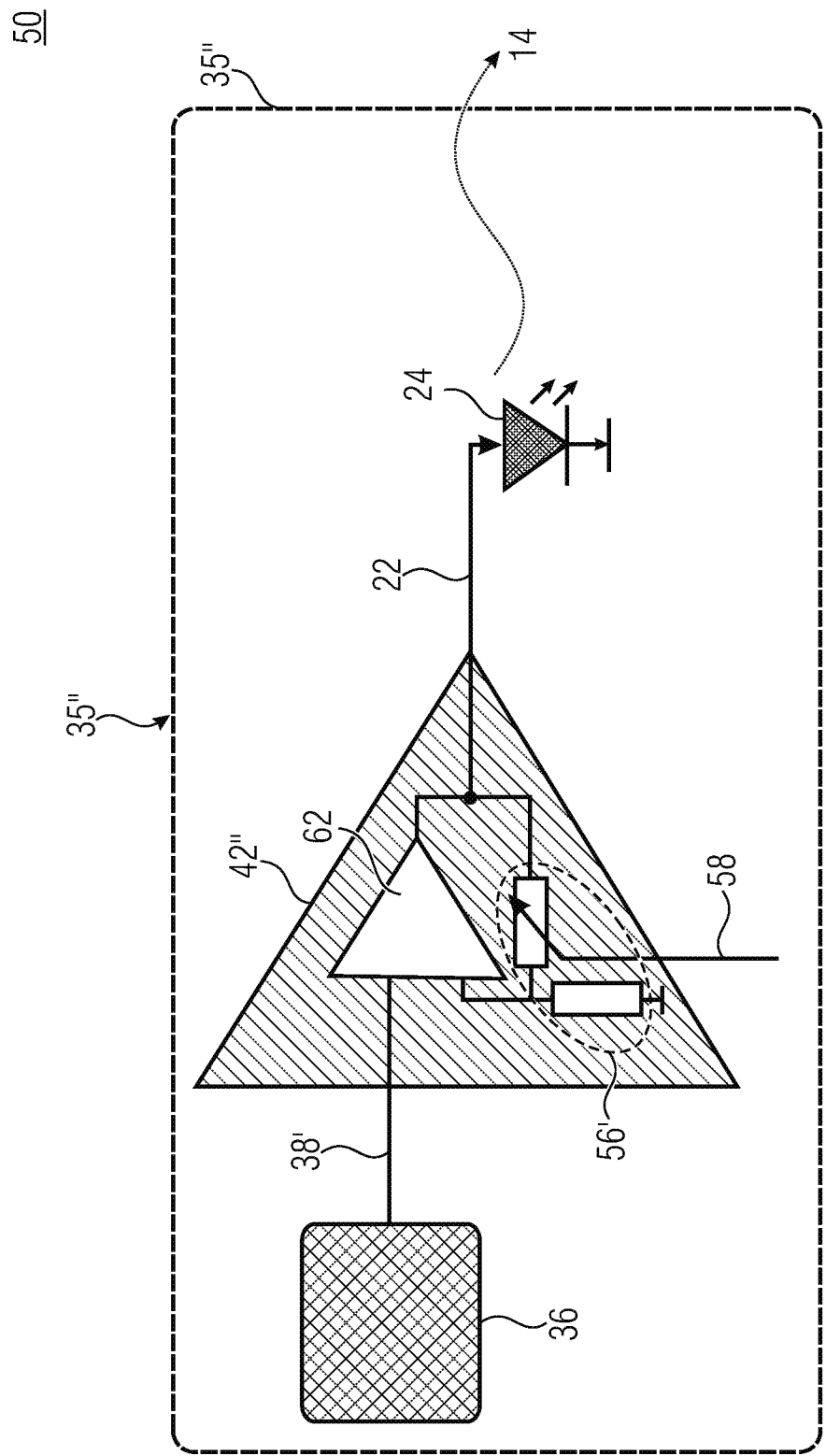
FIG. 5 is a schematic block diagram of part of an apparatus according to an embodiment, wherein a driver circuit is configured to implement a variable gain adjusted based on a control signal.

FIG. 5 shows a schematic block diagram of part of an apparatus 50 where a driver circuit 42" is configured to provide a variable gain of the driver circuit 42" based on the control signal 58. For this, a cooperation with the amplifier element 62 can be varied in a circuit 56', and hence the gain of the driver circuit 42" can be adjusted to adapt the modulation of the optical signal source 24.

Here, the control signal 58 of FIG. 4 and/or of FIG. 5 can be selected in dependence on the channel information 26 in FIG. 1a, such that the adjustment of the driver circuit 42' and/or 42" is performed in dependence on a channel information to at least partly compensate the non-linear distortion.

Thus, an implementation of embodiments in correspondence with the invention described herein can include an implementation in the transmitter. In other words, the adaptive modulation can be realized in an analog manner in the transmitter 35 of the system 300. According to embodiments, the adaptive modulation can be realized completely or partly in a digital manner. In analog realization, the driver circuit 42 has a variable gain. Gain control takes place, for example, continuously or gradually. The gain is varied, for example, by using an adjustable attenuation member (FIG. 4) or regulating the active gain factor (FIG. 5). Both realizations are controlled by the control signal 58.

FIG. 4 shows a realization of the variable driver gain by means of variable attenuation member 56 in the driver and FIG. 5 realization of the variable transmitter gain by means of variable gain by the resistor network 56' in the driver.

62 indicates an amplifier that can result in a variable gain in the context of variable switching and/or due to variable control. For example, a variable switching with an attenuation circuit 56 can be adjusted. This means adapting the modulation of the emitter 24 can take place by adapting a control of the amplifier element 42'/42" such as by a signal amplitude and/or an effective value of an alternating component of the signal 38 and/or by changing an operating state of the amplifier element, such as for adjusting the gain factor.

The illustrated realizations are design examples in the context of embodiments of the present invention. It is obviously also possible to vary the respective other resistor and to realize the variable amplifier in other known architectures. The amplifier can also be operated in inverting configuration or can be configured in a differential manner. As already mentioned, the regulation can be implemented gradually or continuously. Gradual implementation can be realized, for example, with different resistors and switches wherein the impedance and hence the gain is varied by opening and closing the switches. In that case, the switches can be transistors. Alternatively, it is also possible to connect one or several transistors in parallel to a resistor. The voltage at the control input of the transistor is used to regulate the channel resistance of the transistor to vary the gain of the VGA.

Changing the gain of a system, i.e., the change process itself can again result in non-linear distortions that themselves can result in a reduction of the CNR. For addressing this problem, there are a number of configuration options:

It is known in the system when a data signal (data packet, data frame) is transmitted. For this, the DSP 36 provides, for example, a logic control signal. During transmission of the signal, the gain cannot be adapted or the gain is not varied or remains at least approximately unvaried. Adapting the gain takes place accordingly between the packets/frames.

The regulation is so weak or in small steps/changing rates that the noise of the non-linear distortions due to the gain adaptation is small with respect to the other effective noise sources (for example, receiver noise). For gradual adaptation, the steps have to be very small which might be impractical in most systems. For continuous gain adjustment, the change of the gain is very slow, i.e., across a large time interval, i.e., across a plurality of data packets/frames. During the period of a packet, the gain can be approximated as constant.

As mentioned, alternatively or additionally, the modulation of the signal 22 can be regulated completely or partly by the DSP 36. During the generation of the OFDM signal, the DSP can provide the entirety of the carrier with a higher power when the attenuation in the optical channel is particularly strong. Accordingly, the same can reduce the power per carrier when the channel attenuation is particularly weak. In this case, not only the non-linear distortions at the optical emitter 24 are amplified but also at the digital analog converter DAC of the DSP 36. It remains decisive that the entire noise of non-linear distortions is regulated accordingly with respect to the other noise components.

This functionality should not be confused with conventional adaptive power loading as it is sometimes used in OFDM. Here, the power per carrier across the signal spectrum is varied such that the non-ideal transmission function of the connection, for example a low pass attenuation, is compensated [e,f], wherein such distortions are referred to as linear distortions. In contrast to this, in the present invention, the effect of channel attenuation is compensated with respect to the influence of the non-linear distortions. The regulation does not only take place when the signal is very weak but already with a very strong signal as illustrated in FIG. 2a, since it is possible to benefit from a stronger or weaker modulation, for example already from a distance of approximately ~1 meter.

Figure 6:
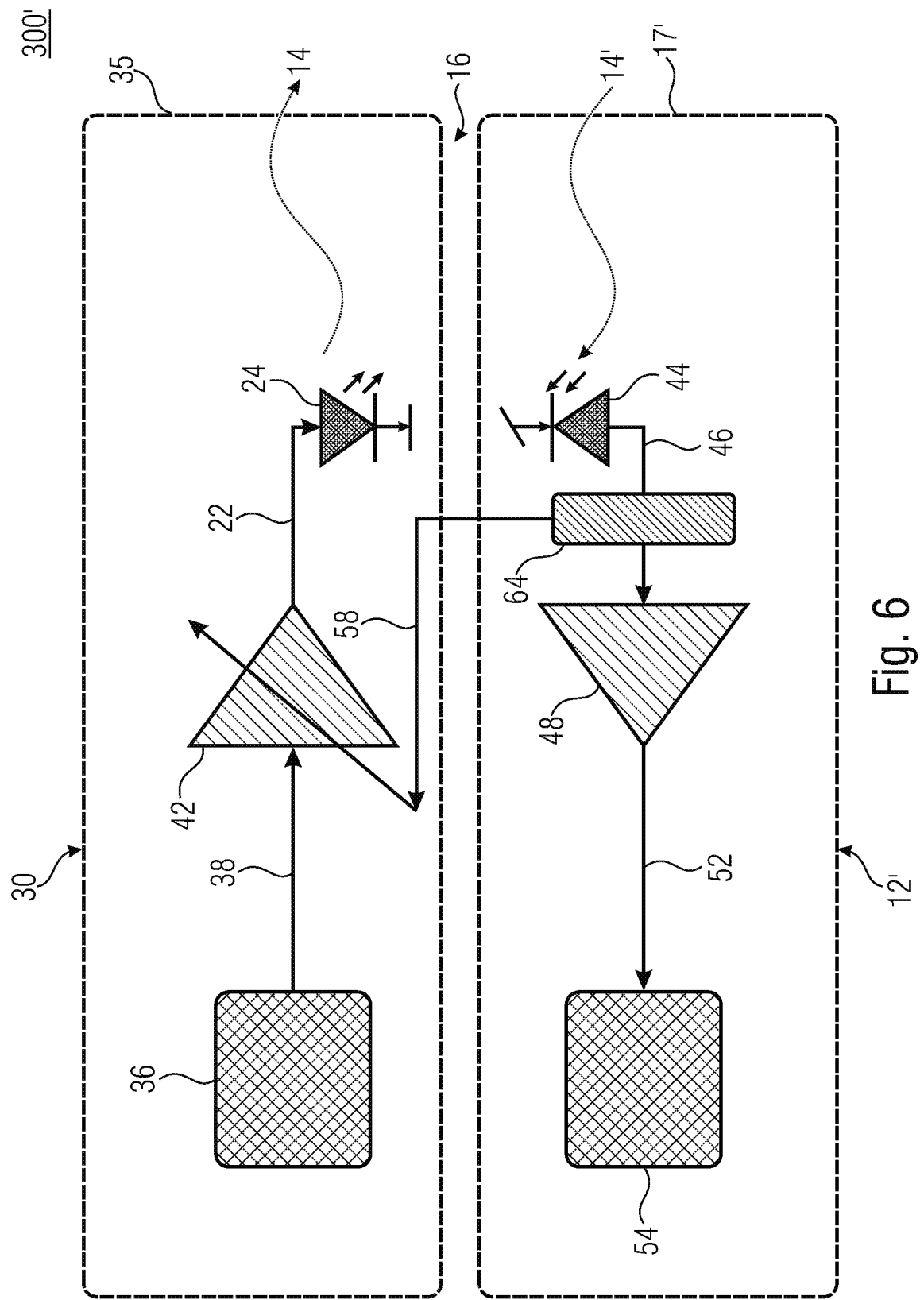
FIG. 6 is a schematic block diagram of an optical wireless network according to an embodiment allowing a feedback by a receiver compared to the optical wireless network of FIG. 3.

As an alternative to determining the control signal 58 at the optical wireless apparatus itself, respective information can also be received by the receiver 12' established for this, as it is illustrated, for example, in FIG. 6, which shows a schematic block diagram of an optical wireless network 300' that allows, in comparison to the optical wireless network 300 of FIG. 3, feedback of the receiver 12' with a receiver 17' to the apparatus 30. For this, the receiver 12' can include a measurement means 64 that is configured, for example, to receive and evaluate the receive signal 46, for example with respect to the received power. The measurement means 64 can be configured to detect a direct component of the photocurrent of the receive signal 46 and to transmit this information or information derived therefrom, such as a quantized value or the same to the optical wireless apparatus 30.

Figure 7:
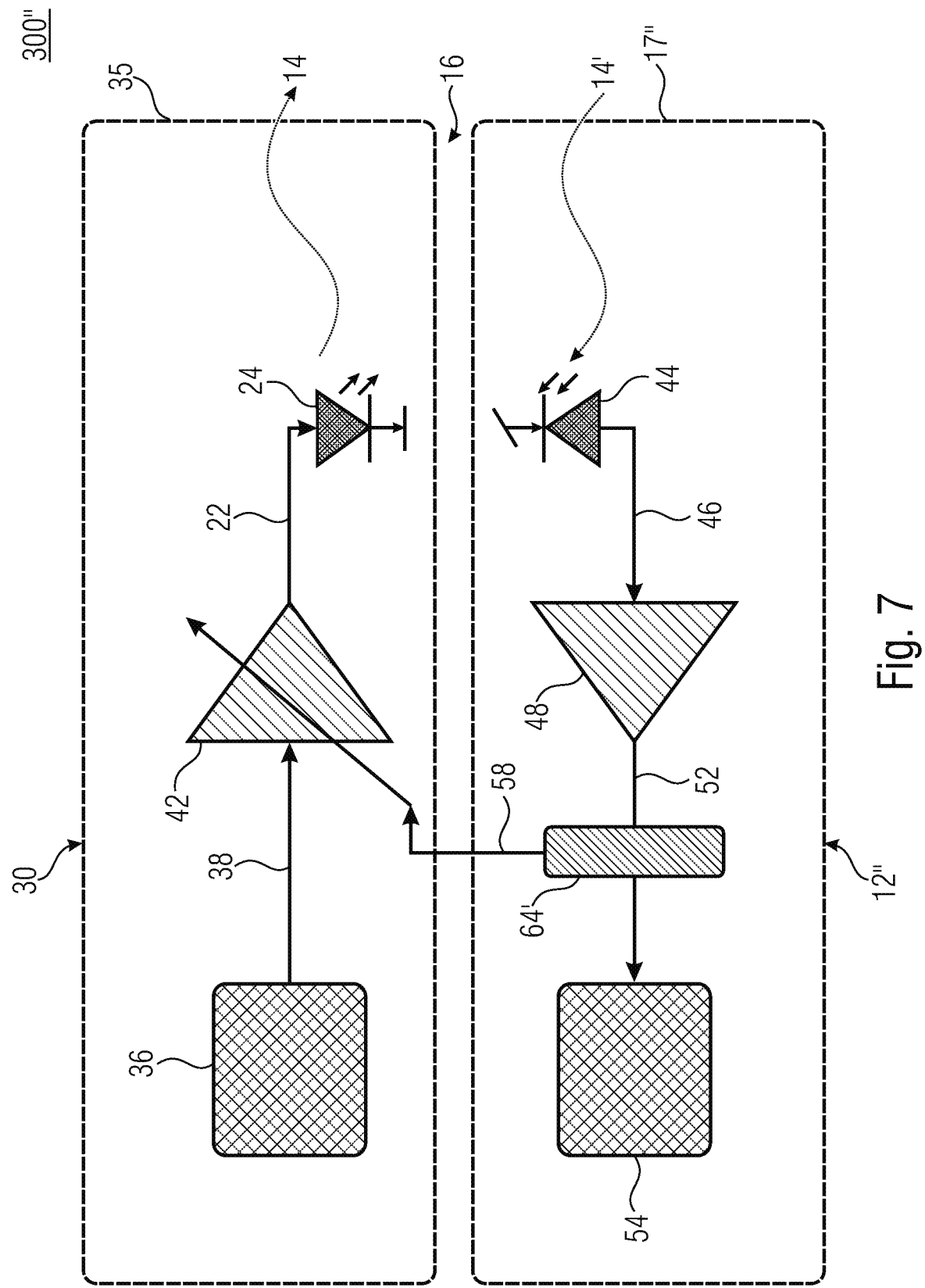
FIG. 7 is a schematic block diagram of an optical wireless network similar to FIG. 6 and according to an embodiment, wherein a measurement means is configured to determine an alternating component of the amplifier signal.

FIG. 7 illustrates an optical wireless network 300" similar to FIG. 6, where a measurement means 64' is configured to detect an AC signal power, i.e., an alternating component of the amplifier signal 52. As an alternative or in addition to the result of the measurement means 64, this measurement result can form at least a part of the control signal 58 for the optical wireless apparatus 30. While in the optical wireless network 300' the channel information is based on the direct component of an optical wireless signal 14' received by the receiver 12" of the optical wireless channel 16 and the same can be associated, for example, for adapting an attenuation member of the electronic signal source 42, FIG. 7 describes a configuration where the channel information is based on an alternating component of the optical wireless signal 14' received by the receiver 12" of the optical wireless channel 16 and is associated with an adaptation of a gain factor of the electronic signal source. For example, the receiver 12' can be used for adjusting the receiver 35' and the receiver 12" for adjusting the receiver 35".

In both cases, a control signal is provided for variable modulation. Some embodiments described herein provide the usage of a calculation rule for generating the control signal 58. The same can be applied for predetermining the control signal 58, such as for storage in an information or data memory, alternatively or additionally also during operation. As clarified by formula (1), the CNR can be formed of signal power $P_{sig}$ to noise power $P_n$. Signal and noise power can be replaced by the respective effective values of the voltages. In the following considerations, the voltages are to be considered as effective values accordingly. In the model described exemplarily herein, the noise is composed of the independent noise quantities of the internal receiver noise $u_{n\ Rx}$ and the noise of non-linear distortions at the transmitter $u_{n\ nl\ TX}$ or receiver $u_{n\ nl\ RX}$. Depending on the system, $u_{n\ nl\ RX}$ can usually be neglected compared to $u_{n\ Rx}$, until overdriving occurs in the receiver. A lower transmitter modulation prevents the occurrence of overdriving, for example, or makes the same appear only at larger receive levels, such that the dynamic range of the link, for example of the data link, also increases towards lower distances. The connection between signal voltage $u_{sig}$ and transmitter modulation is approximately linear, but the dependence of $u_{sig}$ to $u_{n\ nl\ Tx}$ is highly non-linear. As an example, triple beat extortion is stated, which increases with the square of the modulation. This explains why the CNR can be improved when the modulation is reduced.

$$CNR = \frac{P_{sig}}{P_n} = \frac{u_{sig}^2}{u_{n\ Rx}^2 + u_{n\ nl\ Tx}^2 + u_{n\ nl\ Rx}^2} \qquad (1)$$

According to an embodiment, the optical wireless apparatus is implemented to adapt the modulation of the optical signal source 14/24 and can obtain, by adaptation, a noise component as a consequence of the non-linear distortion of an overall noise at the location of the receiver in an order of an internal receiver noise. In that case, normally, the highest data rates are obtained. Here, order means that the value corresponds to at least ⅓ and at most 10 times the other one, which means the noise component of the non-linear distortion of the overall noise at the location of the receiver is at least 33% and at most 1000% of the internal receiver noise.

In other words, according to an embodiment, a control means of the optical wireless apparatus and/or a regulation implemented by the processor 36 can be interpreted such that the modulation of the signal 24 is regulated such that the noise of the non-linear distortions $u_{n\ nl\ Tx}$ does not reduce the CNR and hence not the data rate. Practically, this means that $u_{n\ nl\ Tx}$ should be in the order of the receiver noise $u_{n\ Rx}$, which can represent, for example, a regulation quantity. At the same time, it is intended in some configurations to select the modulation not too low to prevent that a signal voltage $u_{sig}$ that is too low also limits the CNR, which in this case is only formed of $u_{sig}$ and $u_{n\ Rx}$. Practically, $u_{n\ nl\ Tx}$ should have approximately the same amount as the dominant noise source, this means $u_{n\ Rx}$ or $u_{n\ nl\ Rx}$. In that case, $u_{n\ nl\ Tx}$ increases the noise power by $\sqrt{2}$. A further reduction reduces the modulation $u_{sig}$, but to a higher extent than the noise power. It is the basic aim of the variable transmitter modulation to maximize the CNR at a specific receive level at a specific distance.

The control signal 58 that provides the modulation for the transmitter control can be determined, for example, as follows:

The same can be generated at the own receiver by assuming that the signal at the receiver of the communication partner is similar.

FIG. 6: Measuring the DC received power at the block 64 before or after the photodetector 44. In the case of a photodiode, this means a measurement of the direct component of the photocurrent at the anode or cathode of the photodiode. The signal is amplified and supplied to the driver 42.

FIG. 7: Measurement of the AC signal power at the block 64', after the transimpedance amplifier 48 the signal 52 can be tapped and the AC component can be determined (for example determining the RMS value). This voltage is amplified accordingly and supplied to the driver 42.

At the receiver 12'/12" of the communication partner: Systems with bit loading have a function of evaluating the error rate of the system or the CNR to be able to adapt the bit loading accordingly. This information and the current bit loading can be communicated to the communication partner on the protocol side by transmitting a respective message in the same or in a different wavelength range or frequency range. Alternatively, on the protocol side, it can also be communicated directly whether the modulation is to be increased or reduced.

The optical wireless apparatus can have a further optical detector that also detects the signal. This receiver can use a large photodetector. With low bandwidth, the signal can be amplified in a particularly noiseless manner to generate a measure for the direct component of the signal 14'.

The optical wireless apparatus could have a distance meter, such as a time of flight sensor. From the distance, the channel attenuation can be inferred.

In a bidirectional optical wireless apparatus, the control signal can be generated in the DSP 54 by means of digital data processing from the signal 52. By means of determining the harmonic distortion, intermodulation products or other information on non-linear distortions that are extracted from the signal or test signal, the transmitter modulation of the opposite device can be determined. In that way, the channel attenuation and the channel distortion can be calculated by associating the channel distortion with a system specific transmitting power. It is obvious that the described functionality of the DSP could analogously also be implemented in the receiver.

The context between measurement quantity in the receiver and changing the gain in the transmitter can be linear or non-linear, wherein a non-linear regulation allows larger dynamic range of the regulation.

FIG. 6 shows an optical wireless transceiver with variable driver gain, wherein the gain is regulated by a control signal from the receiver, which is generated exemplarily by measuring the direct component of the photocurrent.

FIG. 7 shows an optical wireless transceiver with variable driver gain, wherein the gain is regulated by a control signal from the receiver, which is generated after the amplifier 48 from the signal 42.

As an alternative or an addition to changing the operating state of the electronic signal source, such as by adapting the signal amplitude in the signal processor 66 and/or by adapting the gain in the driver circuit 42, for the adaptation of the non-linear channel distortion, adaptation of an operating point of the optical signal source 24 can also take place.

Figure 8:
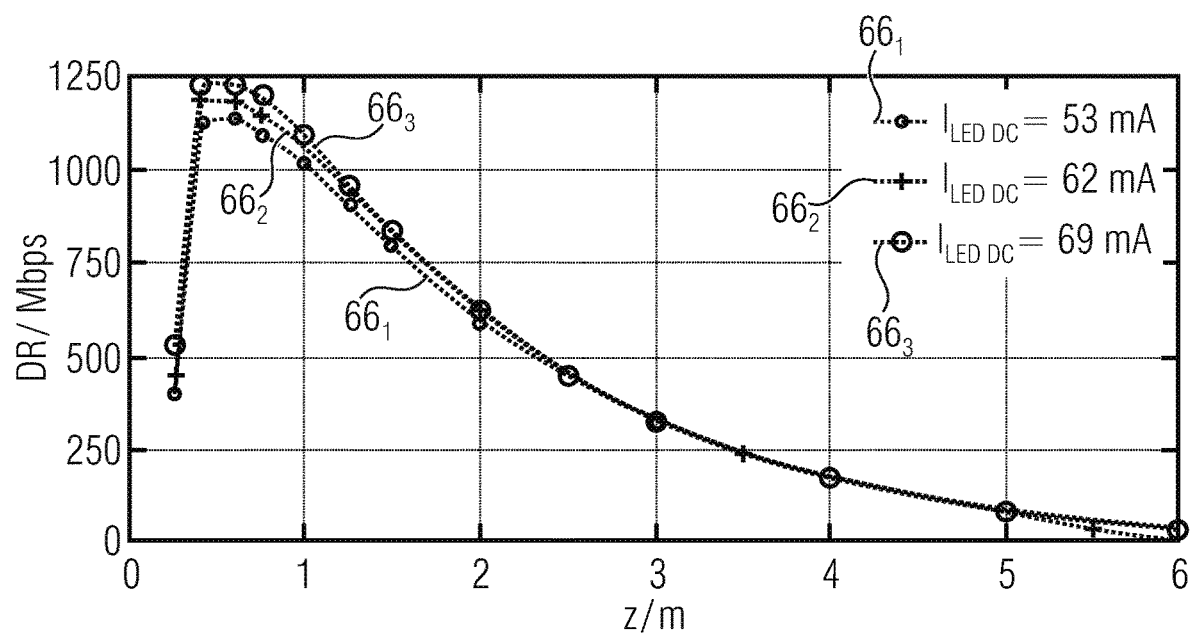
FIG. 8 is an exemplary comparison of obtainable data rate, DR, with respect to a distance plotted on the abscissa and for different operating points of the optical signal source according to an embodiment.

FIG. 8 shows an exemplary comparison of obtainable data rates, DR, with respect to a distance z plotted on the abscissa. Here, curves $66_1$, $66_2$ and $66_3$ show different operating currents/LED DC for the optical signal source 24. Here, it can be seen that at smaller distances, for example up to one meter, a higher current is accompanied by a higher data rate, but that this effect reaches some sort of saturation as soon as the distance exceeds one meter, in that the curves $66_2$ and $66_3$ approach one another and almost overlap at a distance of more than 1.5 meter. On the other hand, at greater distances of, for example, more than 5 meter, with a higher operating current (curve $66_3$) as well as with a lower operating current (curve $66_1$), a higher data rate can be obtained than with an average operating current (curve $66_2$).

In other words, FIG. 8 shows a data rate across distances for different LED operating points.

As operating point, for example, the applied time-averaged operating current or working current can be adjusted. As an alternative or in addition to creating an information memory with different values for the modulation, an information memory or the same information memory with different predefined values that are associated with different values of the channel distortion can be created for the operating point. Such an optical wireless apparatus can be configured to obtain and apply a value to be adjusted for the operating point from the information memory by using the channel information.

An optical wireless apparatus that is implemented to adapt the operating point of the optical signal source 24 can be configured to increase the operating point, in case of a dominant or relevant share of the non-linear distortion in an overall noise and at the same time high noise ratio of the optical wireless signal at a receiver of the optical wireless signal and a simultaneously high data rate in the optical wireless signal. With reference to FIG. 8, this is, for example, the case for lower distances of less than one meter. Alternatively or additionally, such an apparatus can be implemented to reduce the operating point in case of a hardly relevant share of the non-linear distortions in the overall noise and a weak signal power of the optical wireless signal at a receiver. Such a procedure allows a significant reduction of the power consumption of the transmitter. Depending on the transceiver arrangement by up to 10%, 30% or even more than 50%. The non-linear distortion component is, for example, not relevant when the data rate is reduced by less than 5% as a consequence of adapting the operating point by the non-linear distortions.

As discussed in the context of the adaptation of the modulation, such a determination can be made by obtaining respective information from the receiver or by making a respective determination at the location of the transmitter, i.e., the optical wireless apparatus.

In other words, as an alternative or in addition to adapting the modulation of the emitter, the transmitter can benefit from a variable operating point adjustment of the optical emitter (i.e., with and without variable transmitter modulation). The emitter operating point has an influence on the efficiency, the bandwidth and the linearity of the emitter. A relevant or decisive aspect for the OFDM data transmission is that the linearity has significant influence on the maximum data rate but less influence as soon as the receiver noise $u_{n\,Rx}$ dominates. In this range, the operating point influences the data rate only by the dependency of bandwidth and efficiency. This influence is normally much weaker. The measurement in FIG. 8 shows these contexts in data rate curves across the distance for different LED operating point currents at the respective equal transmitter modulation.

As in the variable transmitter modulation, this behavior can be used by an adaptive transmitter. If the CNR (and the data rate) is high, this will normally be limited by the non-linear distortions. In that case, the operating point is increased, for example to reduce the distortions. Thereby, a higher maximum data rate is obtained. If the receive signal is weaker due to higher communication distance, the operating point will be reduced. However, this does not reduce the data rate in FIG. 8 for the three operating points at z=3 m. However, in this example, this reduces the current consumption by approximately 25%. As the transmitter is a significant consumer in the transceiver, on the one hand, this reduces the power consumption of the overall system and, on the other hand, the thermal load is reduced and hence the lifetime is increased.

Analogously to the variable transmitter modulation, the control signal for such a regulation can be generated in the receiver of the own transceiver or in the DSP of the communication partner. The operating point can be adjusted directly by the amplifier 42 or can be imprinted, for example, via a bias tee or AC coupling. Then, the operating point is varied accordingly by adapting the components. In a discrete amplifier 42, this can take place by adapting the common mode voltage by the control voltage 58. According to embodiments, in the bias tee, the control voltage 58 is also applied directly. In an AC coupling, the direct component can be adapted, for example, via a divider ratio of a voltage divider by configuring at least one of the impedances in a controllable manner. Digital programming of the amplifier 42 for a variable output level is also possible.

Figure 9:
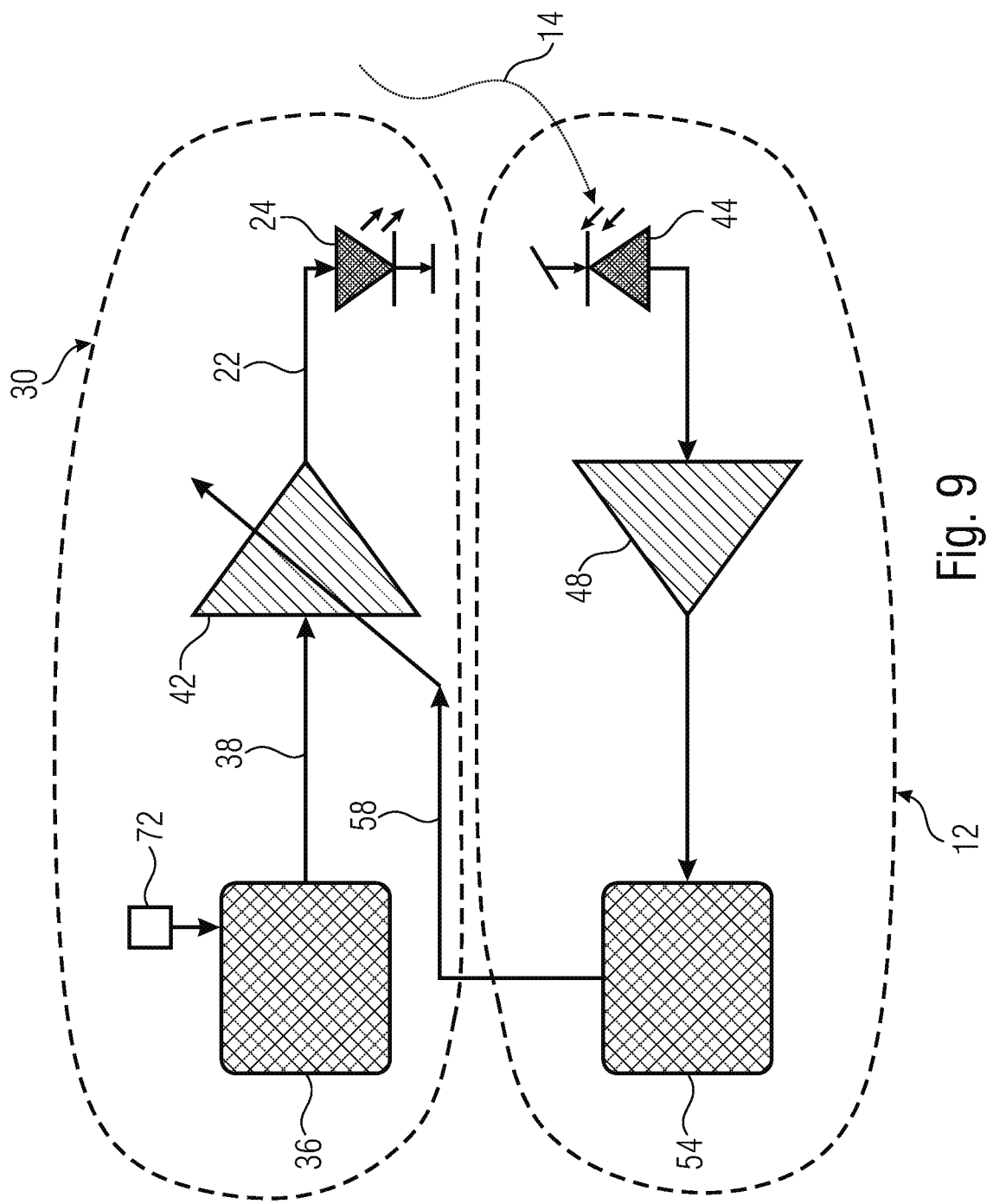
FIG. 9 is a schematic block diagram of an optical wireless network according to an embodiment wherein a processor means is implemented on the receiver side to provide the control signal for adjusting the driver circuit.

FIG. 9 shows a schematic block diagram of an optical wireless network 300''' where the processor means 54 is implemented on the receiver side to provide the control signal 58 for adjusting the driver circuit 42. Alternatively or additionally, the signal 58 can also be used to adjust the operating point of the optical signal source 24. In contrary to the description in the context of FIGS. 6 and 7, this means that the control signal 58 can also be provided by the processor means 54. In deviation from the illustration of FIG. 9, the control signal 58 can also be provided directly to the processor means 36 that implements the respective instructions or derives the control demands to be generated therefrom.

Further, FIG. 9 shows an information memory 72 where, as an alternative or in addition to the control signal 58, instructions for controlling the driver circuit 42 and/or the optical signal source 24 can be stored. This information can be used, for example, to interpret the control signal 58, for example when the same is received by the signal processor 36.

The information memory 72 can comprise different predefined values for the operating point and/or the modulation that are associated with different values of the channel distortion and that are stored. The optical wireless apparatus can be configured to obtain and apply a value for the operating point to be adjusted from the information memory 72 by using the channel information, such as the control signal 58.

In other words, FIG. 9 shows a schematic block diagram of an optical wireless network 300''' wherein the control signal 58 is generated by a block 54 of a receiver chain of the optical wireless signal 14. Alternatively, the control signal can also be generated based on a reception at the transceiver, i.e., along the opposite direction and/or for other signals, such as reference signals or pilot signals.

Figure 10A:
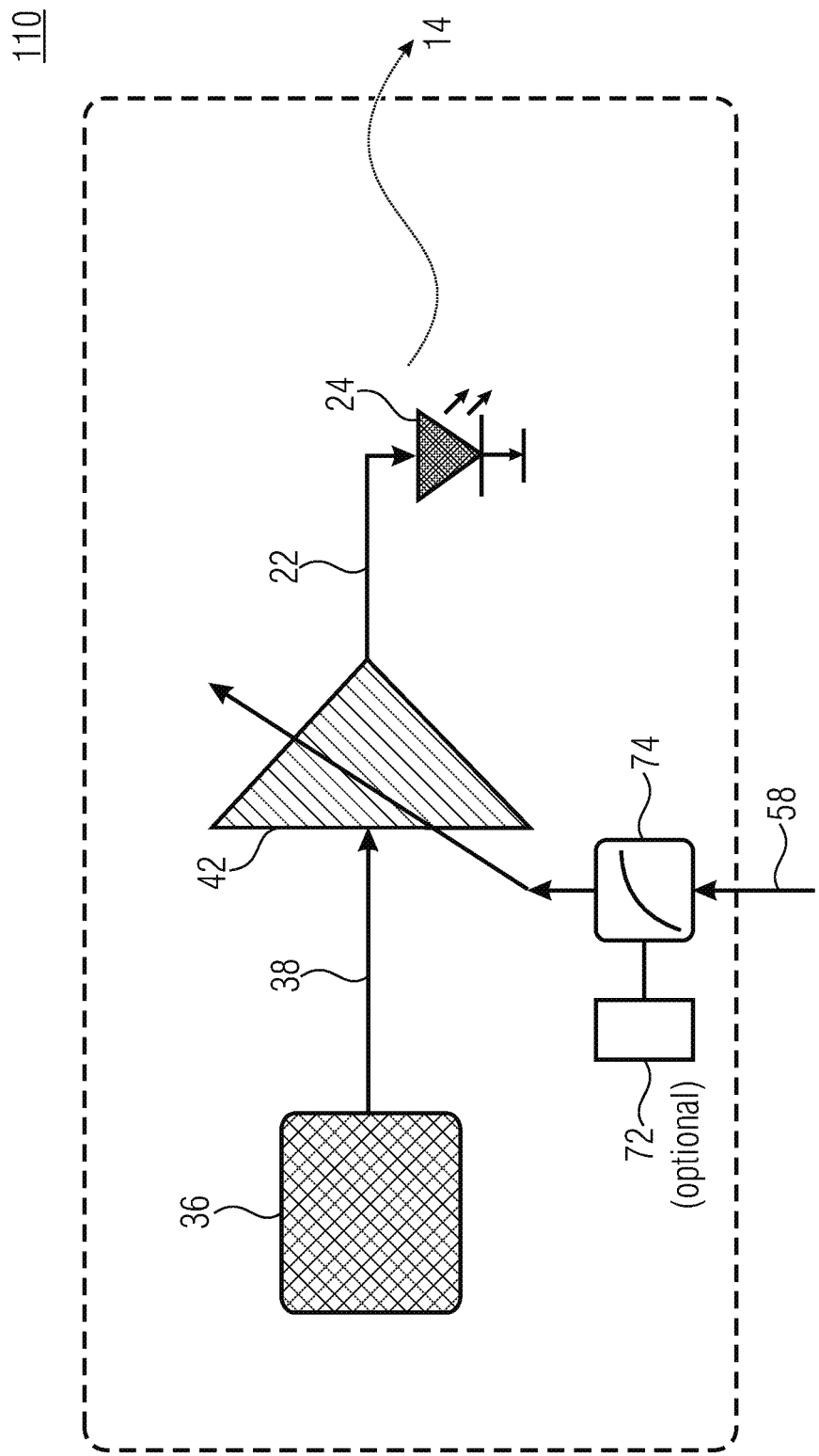
FIG. 10a is a schematic block diagram of part of an optical wireless apparatus according to an embodiment.

FIG. 10a shows a schematic block diagram of part of an optical wireless apparatus 110 according to an embodiment. The same is exemplarily implemented to adapt the modulation of the optical signal source by changing the operating state of the electronic signal source and receives, exemplarily, the control signal 58 as described, for example, in the context of FIG. 4, 5, 6, 7 or 10. The optical wireless apparatus 10 can include a regulating element 74 that can be used as an alternative or in addition to the attenuation circuit 56 or 56' in FIG. 4 or 5. Thus, a control for the driver circuit 42 can be derived from the control signal 58. In other words, FIG. 10a shows a schematic block diagram of an optical wireless apparatus for adapting a gain of the driver 42 to influence the modulation of the optical signal source.

Figure 10B:
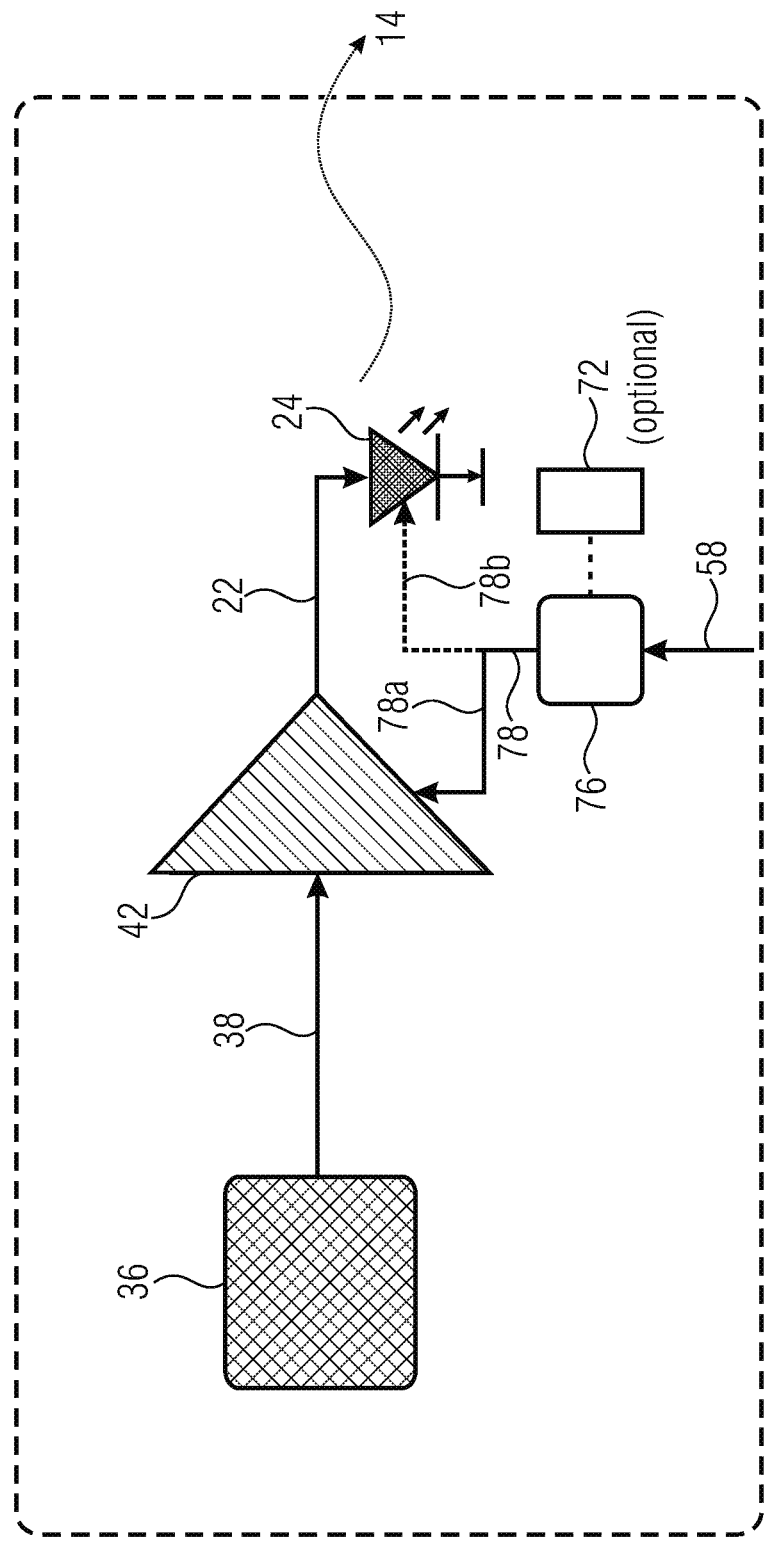
FIG. 10b is a schematic block diagram of a further optical wireless apparatus according to an embodiment comprising a regulating element for receiving the control signal.

FIG. 10b shows a schematic block diagram of a further optical wireless apparatus 110' according to an embodiment comprising a regulating element 76 for receiving the control signal 58. A control signal 78 obtained therefrom can be used by the optical wireless apparatus 110 to control the optical signal source 24 and/or the electronic signal source, i.e., the signal processor 36 and/or the driver circuit 42.

In other words, FIG. 10b shows a schematic block diagram of an optical wireless apparatus for adapting an operating point of the optical signal source 24. The emitter can be adjusted via a DC component of the amplifier 42 (signal 78a) and/or via a control signal to the emitter 24 itself, control signal 78b. The signals 78a and 78b can be the same regarding amplitude, frequency or the same but can also differ from each other.

The behavior of the regulating means 74 and/or 76 can be linear or non-linear, but advantageously non-linear. Optionally, the regulating means 74 and/or 76 can be coupled to the information memory 72. Here, it can be defined which gain or characteristic is adjusted in the electronic signal source or the optical signal source at what control signal 58 or at what amplitude, frequency or other characteristic. In other words, some characteristics of embodiments described herein can also be described as:

Control signal 58:
has a known dependence on the channel attenuation and can therefore be used to infer the channel attenuation,
originates, for example, from the receiver (direction/alternating component, before or after the receiver amplifier; or from the receiver DSP as PSD (power spectral density); or as data packet of the opposite transceiver), or from a distance measurement (for example, beacon or the same same)

Regulating element 74 (for example means 56 or 56'):
defines in what way a change of the control signal 58 results in a change of the gain;
transmission function is non-linear since an attempt is made to maximize the CNR by changing the modification and to allow a dynamic range of the regulation that is as large as possible behavior:
a look-up table can be stored that defines which gain is adjusted for which control signal.
Alternatively, the gain can be optimized in an iterative manner: If the control signal changes by a predetermined value, the gain is increased; if the CNR/data rate in the DSP has decreased, the opposite adaptation is performed; this is repeated until no improvement can be obtained anymore.

As an alternative or in addition: The regulating element 76 for changing the operating point current is controlled by the same control signal 58 but regulates, in contrary to the regulating element 74, the operating point of the optical emitter. The signal 58 of FIG. 10b can be the identical signal as in FIG. 10a, for example when the element 74 and 76 derive different actions from the signal (or two individual signals that are possibly adapted to element 74 or 76). Adjusting the modulation in the DSP and/or in the amplifier element on the one hand and adapting the operating point of the emitter in the DSP and/or by the element 76 can take place together or also independent of one another.

The functions in the elements 74 and/or 76 can be linear or non-linear, as illustrated in FIG. 10a and FIG. 10b.

FIG. 11 shows again the curves $34_1$, $34_2$, $34_3$ and $34_4$ of FIG. 2a.

FIGS. 12a, 12b and 12c each show an exemplary table, wherein the tables of FIGS. 12a to 12c are linked to one another by the respective characteristics. Thus, the tables of FIGS. 12a and 12b show corresponding distances between a wireless transmitter and corresponding receiver, wherein the table of FIG. 12a shows the different modulations of FIG. 2a and FIG. 11 in the lines. In the table of FIG. 12b, a measurement quantity is illustrated in association with the respective distance, as well as a control quantity amplified from this measurement quantity, which can, for example, serve as control signal 58 or as a basis thereof. FIG. 12c shows exemplarily what modulation of the electronic signal source can be associated with the respective measurement quantity of the table of FIG. 12b, wherein here the values are quantized, for example, in the different modulations of the table in FIG. 12a. This means it can be inferred from FIG. 12b for different distances at what measurement quantity, which is described in the fields of the table of FIG. 12a, the respective data rate can be maximized In other words, the table of FIG. 12a shows exemplarily in the context of the exemplary control for FIG. 2a or FIG. 11 and the data rates illustrated therein, for which the envelope is generated according to FIG. 2a, an exemplary measurement result of a value for a data rate DR in Mbps. At each distance between transmitter and receiver, different modulations of the optical emitter have been adjusted. The maximum values of one column can be considered as modulation to be selected for the respective distance associated with the channel attenuation. As can be seen at the highlighted numbers, the modulation 9.3 dBm for the distance of 0.15 meter is provided with the highest data rate as well for the distance 0.4 meter. At a distance of one meter, the modulation 13.7 dBm provides the best results, while the modulation of 17.2 dBm for the distances 2 meters, 4 meters and 6 meters provides the best results of the data rate. The modulation of 22 dBm is effective at higher distances of 8 meters and 10 meters.

Figure 11:
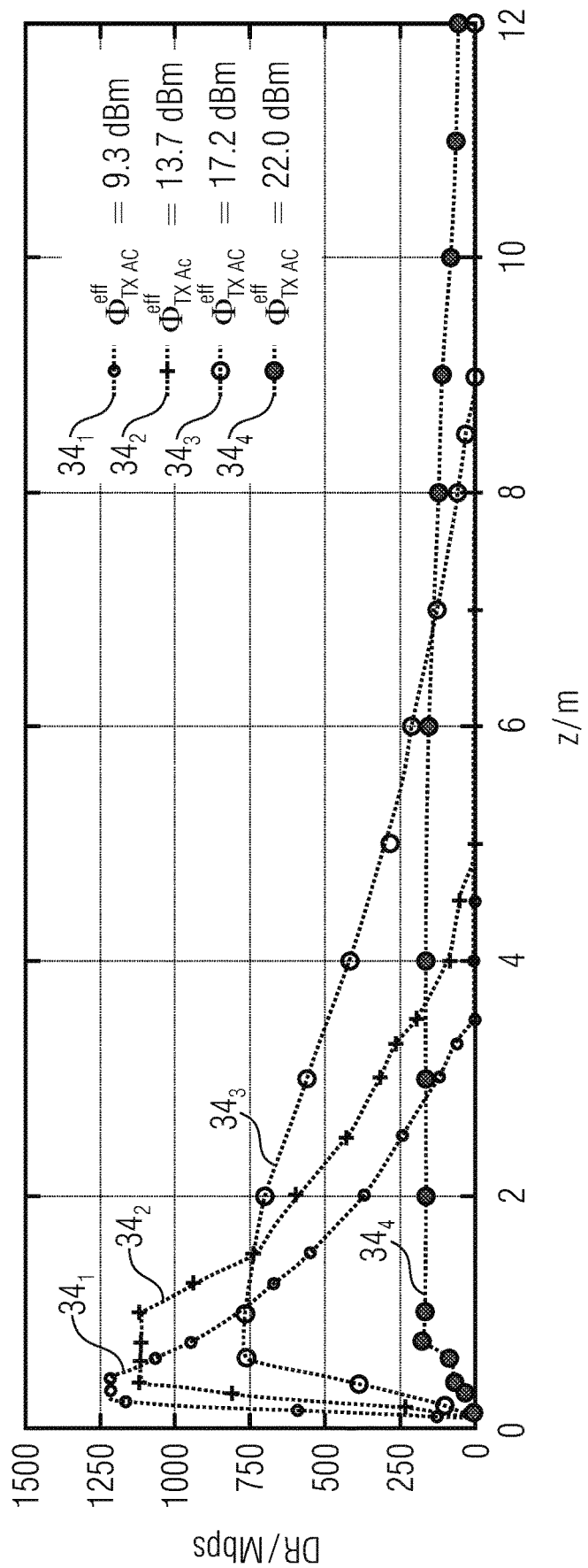

The table of FIG. 12b shows a connection with the exemplary control of FIG. 2a or FIG. 11 and the data rates illustrated therein as well as values of a measurement quantity, such as a received power of the optical wireless signals from FIG. 12a. The different measurement quantities can be converted into a control quantity whose step widths can be adapted to the hardware of the transmitter and/or receiver and is illustrated in the line "control quantity amplified from measurement quantity" and can form, for example, a basis for the control signal 58. A resulting functional connection between measurement quantities and control quantity as well as between control quantity and modulation and/or operating point is, for example, non-linear.

The table of FIG. 12c shows a connection with exemplary control of FIG. 2a or FIG. 11 and data rates illustrated therein as well as a result of the correlation from the tables of FIGS. 12a and 12b. A value indicating, for example, a control quantity of FIG. 12b can be associated with a modulation of FIG. 2a and/or FIG. 11 or the table of FIG. 12a, wherein the signal 58 is, for example, a voltage level. Alternatively or additionally, the indicated value can be transmitted to a device within an encoding or a bit pattern as quantity to be applied so that the same changes its state.

The teachings of FIGS. 12a, 12b and 12c are equally applicable for changing the operating state of the electronic data source for adapting the modulation of the optical signal source and for adapting the operating point of the optical signal source.

FIG. 2a, FIG. 11 as well as the tables of FIG. 12a-c show:
measure DR or CNR across the distance for different transmitter modulations,
determine the maximum of all curves for each distance,
provide the context between control quantity 58 and distance.
regulate modulation or operating point according to the control quantity 58

The control signal can be used, for example, as basis for controlling the element 56, 56' of FIG. 4 and/or FIG. 5 and/or as basis for adjusting the regulating element 74 of FIG. 10a.

In a similar manner, a control current can be determined from the respective maximum values of the data rate of FIG. 8, which is to be adjusted at a respective channel attenuation, for example, by determining the distance between transmitter and receiver.

Figure 13:
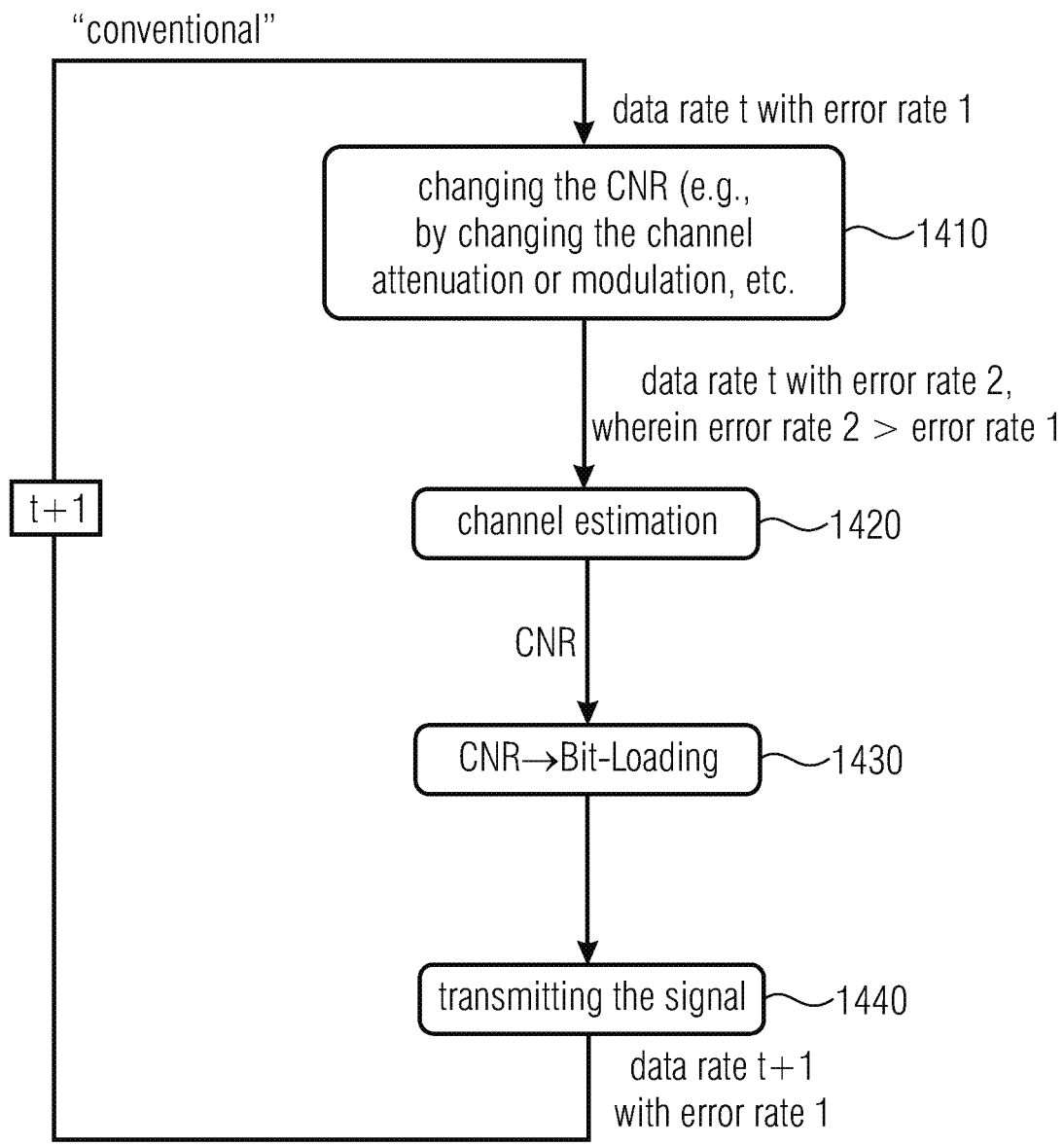
FIG. 13 is a schematic flow diagram of a known method, wherein a result of the channel estimation results in an amended bit rate of the data signal.

FIG. 13 shows a schematic flow diagram of a known method 1400 wherein a result of the channel estimation 1420 leads to an amended bit rate of the data signal, the bit loading, when the carrier-to-noise ratio is changed (step 1410). The change is implemented in a step 1430 and results in transmitting 1440 before a renewed check is performed in a further iteration run. Here, t encodes the current time period or the current clock and t+1 the following time period or clock.

Figure 14:
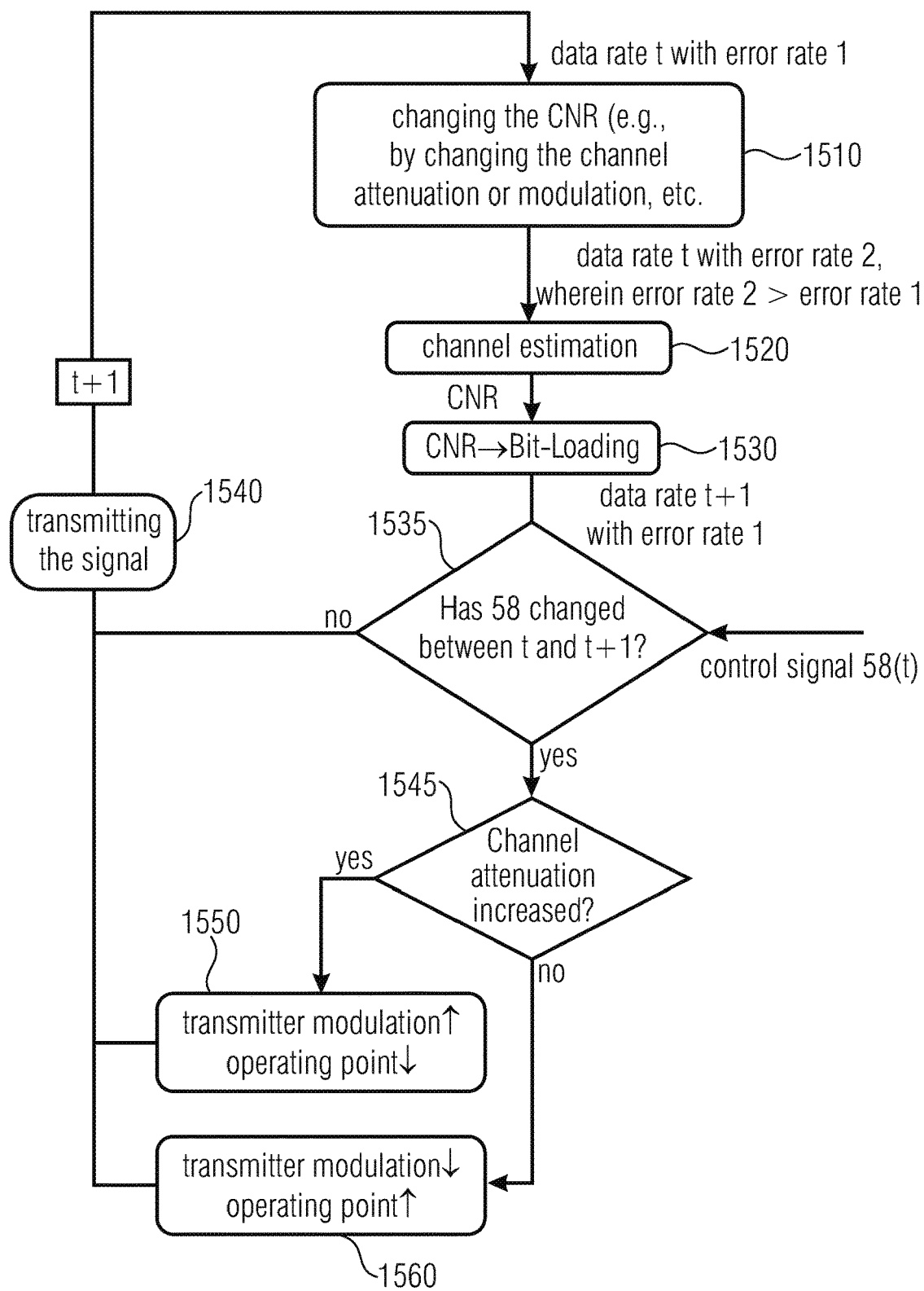
FIG. 14 is a schematic flow diagram of a method according to an embodiment considering a change of the channel attenuation.

FIG. 14 shows a schematic flow diagram of a method 1500 according to an embodiment. In one iteration run, for example, the carrier-to-noise ratio changes, for example by changing the channel attenuation or the modulation (step 1510). This is accompanied by a data rate at a time t as well as a first error rate 1. Thereby, a second error rate 2 that is greater than the error rate 1 is present at the same data rate at t. A channel estimation 1520 can provide the CNR and effect an amended data rate for a time interval p+1. The method 1500 can include a decision whether a control signal 58 has changed between the previous run t and the current run t+1. If this is not the case, the signal can be transmitted, step 1540, which can lead to the conventional method 1400, apart from the decision 1535. If, however, the control signal 58 has changed (path "yes" in the decision 1535), it can be decided in a decision 1545 whether the channel attenuation has increased. If the result is "yes", the transmitter modulation can be increased and/or the operating point of the optical signal source can be decreased, step 1550. If the decision 1545 provides the result "no", the transmitter modulation can be decreased and/or the operating point of the optical signal source can be increased, step 1560.

In other words, FIG. 14 shows a schematic flow diagram of a method according to an embodiment wherein it is checked whether a control signal indicating a channel attenuation (indicated by the control signal 58) has changed between two transmission intervals t; t+1. If yes, an evaluation is made whether the channel attenuation has increased or not, i.e., whether the same has decreased. If the attenuation has increased a transmitter modulation can be increased and/or the operating point can be reduced, i.e., for example a lower operating point current. Otherwise, the transmitter modulation can be reduced and/or the operating point increased. This method can be performed such that, for example, the DSP 36 can implement an adaptation of the signal transmitting in dependence on the obtained results, such as by adapting digital signal processing. This can take place, for example, by changing the modulation at the analog-to-digital converter of the DSP itself as described and/or the DSP can adjust the operating point of the emitter.

Figure 15:
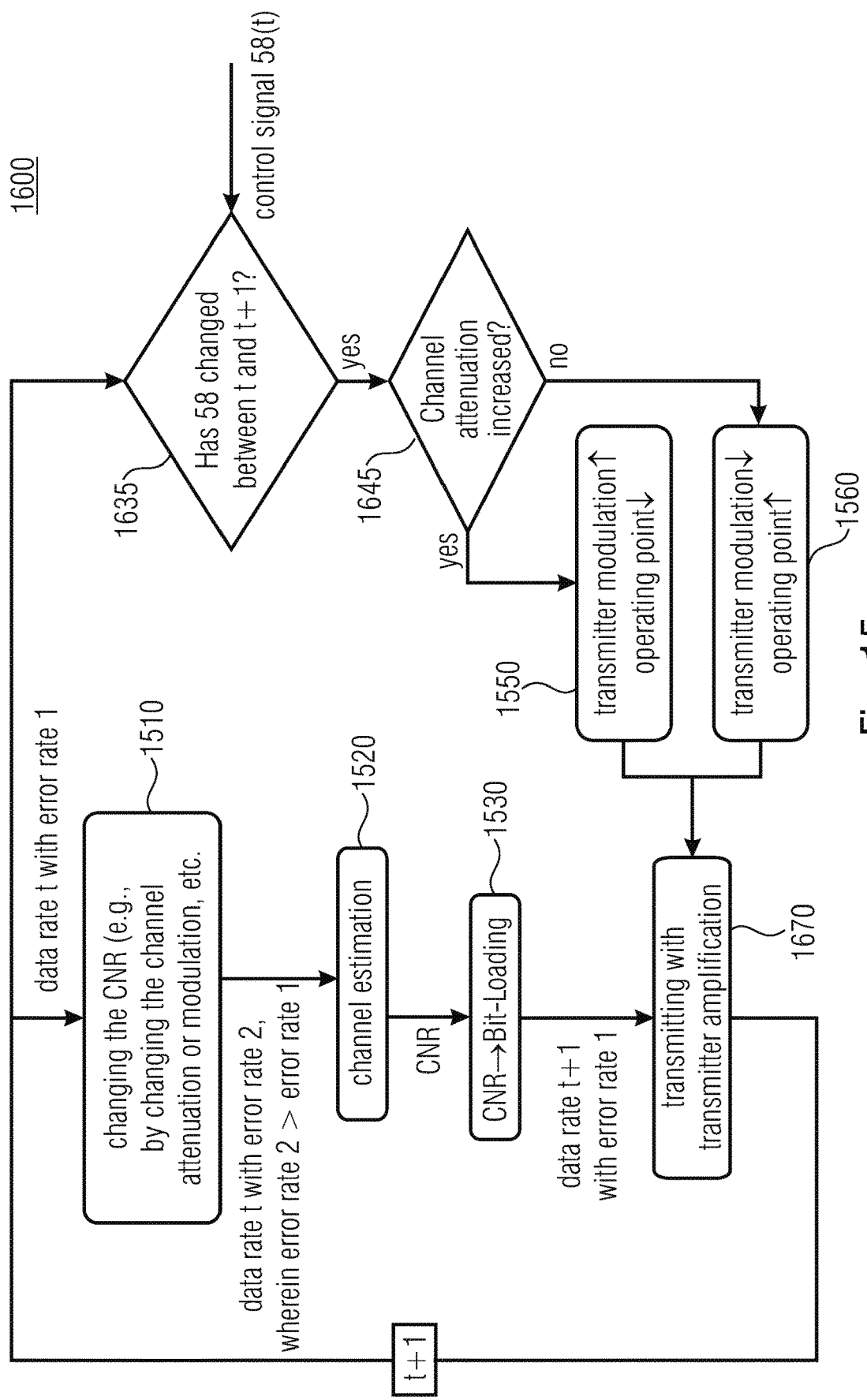
FIG. 15 is a schematic block diagram of a further method according to an embodiment modifying the method of FIG. 14.

FIG. 15 shows a schematic block diagram of a further method 1600 according to an embodiment. The steps 1510, 1520 and 1530 can be implemented in corresponding order to the method 1500. On the other hand, straight at the beginning of a new iteration loop, a decision 1635 corresponding to the decision 1525 can be made in parallel to these steps, whether the control signal 58 has changed between the previous time interval t and the current time interval t+1. If this is the case, it can be checked whether the channel attenuation has increased which is discussed in the decision 1645. Analogously to the method 1500, the steps 1550 and 1560 can be implemented in dependence on the response of the decision 1645 and can lead to a step 1670 that results in transmitting with the adapted transmitter gain.

Here, the transmitter modulation and/or the operating point are also adapted due to a changed control by the control signal 58.

In other words, FIG. 15 shows a schematic flow diagram of a method according to an embodiment wherein it is also checked whether a control signal indicating a channel attenuation (indicated by the control signal 58) has changed between two transmission intervals t; t+1. If yes, an evaluation is made whether the channel attenuation has increased or not, i.e., whether the same has decreased. If the attenuation has increased, a transmitter modulation can be increased and/or the operating point can be reduced, i.e., for example a lower operating point current, otherwise the transmitter modulation can be reduced and/or the operating point can be increased. This method can be independent of the bit loading of the DSP. This can take place, for example, by controlling the gain and/or the emitter operating point.

Embodiments described herein also describe optical wireless apparatuses that are configured to adapt the optical wireless signal, to perform adaption of the modulation of the optical signal source and/or the adaptation of the operating point of the optical signal source to vary the non-linear distortions generated by the optical wireless apparatus.

According to an embodiment, for adapting the modulation, an amplitude and/or an effective value of an alternating component of the data signal can be adapted, such as by a signal processor and/or a driver circuit or amplifier circuit.

According to an embodiment, an optical wireless apparatus for adapting the operating point of the optical signal source can be configured to adapt a direct component of the data signal and/or to adapt a current consumption of the optical emitter. An impregnated operating point current or impregnating the operating point current can take place, for example, by using and adjusting a bias tee, a current source and/or by changing the direct component of the signal 22. Here, the driver can perform the change. According to an embodiment, the driver circuit 42 can be implemented for such an adaptation.

According to an embodiment, an optical wireless apparatus implemented to adapt the modulation of the optical signal source can be configured to increase, by means of adapting the modulation, a noise ratio of a later optical wireless signal transmitted in a subsequent transmission interval via the optical wireless channel at the location of a receiver of the optical wireless signal. By reducing the non-linear distortions or increasing the signal power, the receiving quality can be improved.

According to an embodiment, the electronic data source can be configured to increase the data rate for the later wireless optical signal based on an increased noise ratio. This means, while expecting an improved receiving quality at the receiver, the bit loading can be adapted accordingly by a modulation in the DSP.

According to an embodiment, an optical wireless apparatus is implemented to adapt the modulation of the optical signal source and configured to emit the optical wireless signal based on a first power value of the electronic signal. The optical wireless apparatus can be configured to adapt the modulation of the optical signal source based on a channel information, such that the same indicates an increased received power and a reduced noise ratio at the receiver of the optical signal with respect to a previous transmission interval by reducing an alternating component of an electronic signal for a later optical wireless signal towards a second alternating component. The optical wireless apparatus can additionally be configured such that the same adapts the modulation of the optical signal source based on a channel information that indicates the reduced received power and a reduced noise ratio at the receiver of the optical wireless signal with respect to a previous transmission interval by increasing an alternating component of an electronic signal for a later optical wireless signal towards a second alternating component. This is, for example, indicated in step 1550, and reducing the alternating component in step 1560.

Embodiments described herein provide optical wireless apparatuses that are implemented to adapt the modulation of the optical signal source and that are configured to obtain the channel information as a control signal 58 comprising a dependence on a channel attenuation and on the non-linear distortion of the optical wireless channel, for example the CNR.

Optical wireless apparatuses described herein can be configured such that the electronic signal source is configured to adapt a data rate of the data signal by means of bit loading based on a noise ratio of optical signals transmitted and/or received in previous transmission intervals as discussed, for example, in the context of FIGS. 14 and 15.

Further, embodiments described herein provide an optical wireless apparatus formed as a transceiver and configured to transmit and receive optical wireless signals.

According to an embodiment, an optical wireless apparatus can be configured to perform the adaptation of the modulation of the optical signal source partly or exclusively outside a transmission interval in which an optical wireless signal is transmitted, for example for preventing the non-linearities caused thereby. Alternatively or additionally, the apparatus can be configured to perform the adaptation of the operating point of the optical signal source partly or exclusively outside a transmission interval in which an optical wireless signal is transmitted, also for preventing the non-linearities.

According to an embodiment, an optical wireless apparatus can be configured to perform the adaptation of the modification of the optical signal source gradually, wherein a step width is adapted to the optical wireless channel such that non-linear distortions in the optical wireless channel occurring due to the change can be neglected. This also allows adjustment during transmission, even when this can result in higher time requirements by applying several small steps. Alternatively or additionally, adapting the operating point of the optical signal source can be performed gradually and the step size can be adapted to the optical wireless channel such that non-linear distortions in the optical wireless channel occurring due to the change can be neglected. For this, the step size can be selected, for example such that the resulting noise due to the non-linear distortions increases the noise at the output of the receiver by less than 20%, 15% or 10%, which means this noise component is significantly smaller than the intrinsic receiver noise.

According to an embodiment, the optical wireless apparatus is configured to transmit the optical wireless signal as amplitude-modulated signal or as multicarrier-modulated signal, such as an orthogonal frequency division multiplex (OFDM) signal.

According to an embodiment, the optical wireless apparatus is configured to obtain the channel information as an instruction to adapt the modulation or to adjust the operating point and to implement the instruction. For this, for example, the control signal 58 can be used.

Embodiments described herein further describe an optical wireless network with an optical wireless apparatus according to one of the embodiments described herein and a receiver for receiving the optical wireless signal. This receiver can optionally be configured to output a respective feedback for estimating the channel.

Figure 16:
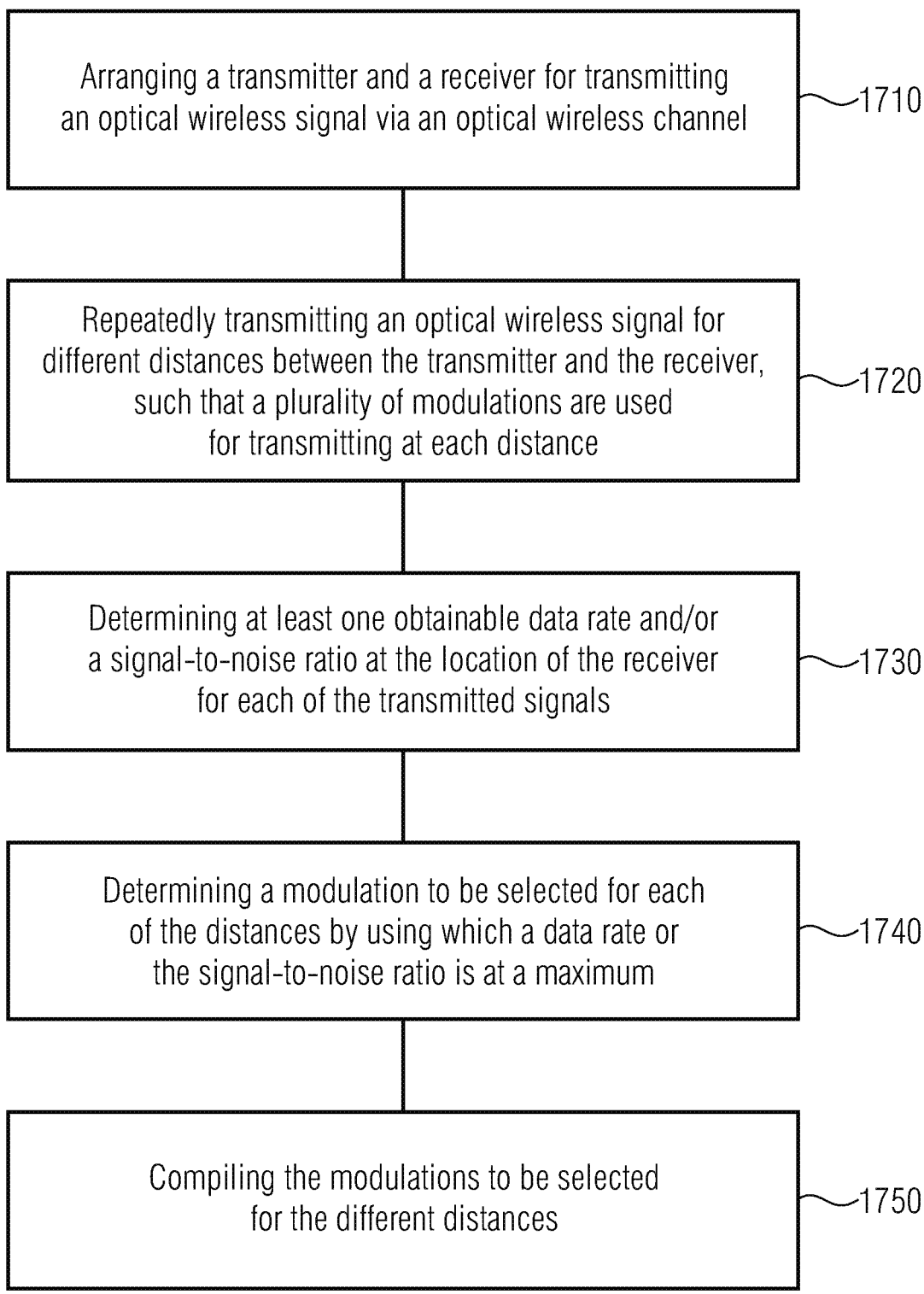
FIG. 16 is a schematic flow diagram of a method for determining a modulation of an optical signal source to be selected according to an embodiment.

FIG. 16 shows a schematic flow diagram of a method 1700 according to an embodiment. Step 1710 includes arranging a transmitter and a receiver for transmitting an optical wireless signal via an optical wireless channel. Step 1720 includes repeatedly transmitting an optical wireless signal for different distances between the transmitter and the receiver, such that a plurality of modulations are used for transmitting at each distance. With reference to the tables of FIGS. 12a, 12b and 12c, several of the modulations can be tested for different distances, see the table of FIG. 12a.

Step 1730 includes determining at least one obtainable data rate and/or a noise ratio at the location of the receiver for each of the transmitted signals, see, for example, the measurement quantities of FIG. 12b and/or the data rate in FIG. 12a.

Step 1740 includes determining a modulation to be selected for each of the distances by using which a data rate or the noise ratio is at a maximum, see the contents of the table of FIG. 12c.

Step 1750 includes compiling the modulation to be selected for the different distances, which can be stored, for example, in the information memory 72.

Figure 17:
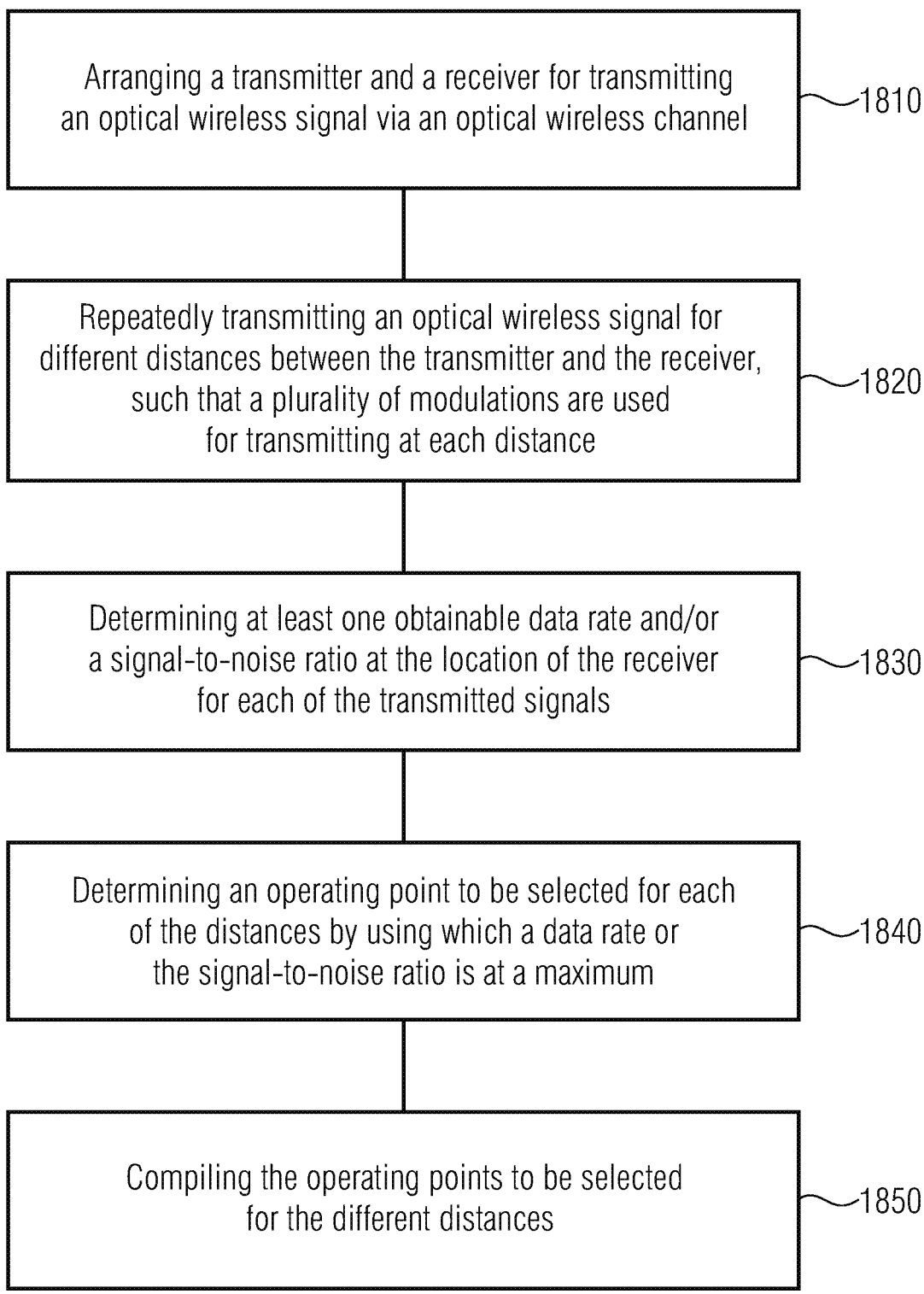
FIG. 17 is a schematic flow diagram of a method for determining operating points of an optical signal source to be selected according to an embodiment.

FIG. 17 shows a schematic flow diagram of a method 1800 according to an embodiment. Compared to the method 1700 it can be used to determine the adjustment of the operating points of the optical signal source. In step 1810, arranging a transmitter and a receiver for transmitting an optical wireless signal via an optical wireless channel takes place. In step 1820, repeatedly transmitting an optical wireless signal for different distances between the transmitter and the receiver takes place, such that a plurality of operating points can be used for transmitting at each distance.

Step 1830 includes determining at least one obtainable data rate and/or a noise ratio at the location of the receiver for each of the transmitted signals.

In step 1840, determining an operating point to be selected for each of the distances takes place, by using which a data rate or the noise ratio is at a maximum.

In step 1850, compiling the operating points to be selected for the different distances takes place.

According to embodiments, the variations in the control can be performed both for adapting the operating states of the electronic signal source as well as for adapting the operating points of the optical signal source wherein also merely one of these two concepts is possible in dependence on the later adjustment option in the optical wireless apparatus.

Embodiments have the positive side effect that overdriving at the receiver is also prevented or reduced, similar to an automatic gain control (AGC) at the receiver. Since the AC component of the transmitting signal is reduced at a low channel attenuation, the same does not lead to overdriving so quickly. If the DC component of the optical signal results in saturation of the receiver the invention described herein does not show any improvement.

The regulating range can be several dB but also more than 10 dB as shown in FIG. 2a. The specific useful range depends on the maximum modulation depths of the OFDM signal and the specific technical realization of the regulation.

Here, embodiments are not limited to OFDM signals but also relate to other types of signal modulation where non-linear distortions can have a negative influence, for example, in amplitude modulation.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable. Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer. A further embodiment of the inventive method is, therefore, a data carrier (or a digital storage medium or a computer-readable medium) comprising, recorded thereon, the computer program for performing one of the methods described herein. The data carrier, the digital storage medium, or the computer-readable medium are typically tangible or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods are performed by any hardware apparatus. This can be a universally applicable hardware, such as a computer processor (CPU) or hardware specific for the method, such as ASIC.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[a] Elgala, H.; Mesleh, R.; Haas, H.: A study of LED nonlinearity effects on optical wireless transmission using OFDM. In: 2009 IFIP International Conference on Wireless and Optical Communications Networks, IEEE, 2009, p. 1-5

[b] Huang, Xingxing; Wang, Zhixin; Shi, Jianyang; Wang, Yiguang; Chi, Nan: 1.6 Gbit/s phosphorescent white LED based VLC transmission using a cascaded pre-equalization circuit and a differential outputs PIN receiver. In: Opt. Express 23 (2015), August, Nr. 17, S. 22034-22042. http://dx.doi.org/10.1364/OE.23.022034

[c] Chun, H.; Rajbhandari, S.; Tsonev, D.; Faulkner, G.; Haas, H.; O'Brien, D.: Visible light communication using laser diode based remote phosphor technique. In: 2015 IEEE International Conference on Communication Workshop (ICCW), IEEE, 2015, S. 1392-1397. http://dx.doi.org/10.1109/ICCW.2015.7247373

[d] Ying, K.; Yu, Z.; Baxley, R. J.; Qian, H.; Chang, G.; Zhou, G. T.: Nonlinear distortion mitigation in visible light communications. In: IEEE Wireless Communications 22 (2015), No. 2, p. 36-45

[e] Khalid, A. M.; Cossu, G.; Corsini, R.; Choudhury, P.; Ciaramella, E.: 1-Gb/s Transmission Over a Phosphorescent White LED by Using Rate-Adaptive Discrete Multitone Modulation. In: IEEE Photonics Journal 4 (2012), No. 5, p. 1465-1473

[f] Hong, Y.; Wu, T.; Chean, L.: On the Performance of Adaptive MIMO-OFDM Indoor Visible Light Communications. In: IEEE Photonics Technology Letters 28 (2016), No. 8, p. 907-910. http://dx.doi.org/10.1109/LPT.2016.2517192

The invention claimed is:

1. An optical wireless apparatus implemented for transmitting an optical wireless signal via an optical wireless channel, comprising:
   an electronic signal source that is configured to provide a data signal; and
   an optical signal source that is configured to convert the data signal into the optical wireless and to emit the same;
   wherein the optical wireless apparatus is configured to acquire channel information comprising information associated with a non-linear channel distortion of the optical wireless signal in the optical wireless channel and to perform adaptation of a modulation of the optical signal source by changing an operating state of the electronic signal source for adapting the non-linear channel distortion and/or to perform adaptation of an operating point of the optical signal source for adapting the non-linear channel distortion;
   wherein the wireless apparatus is configured to adapt the optical wireless signal to perform the adaptation of the modulation of the optical signal source and/or the adaptation of the operating point of the optical signal source to vary the non-linear channel distortions generated by the optical wireless apparatus.

2. The optical wireless apparatus according to claim 1, wherein the adaptation of the non-linear channel distortion depends on the current transmitter-receiver arrangement or the current channel attenuation.

3. The optical wireless apparatus according to claim 1, wherein the channel information is based on a noise ratio of the optical wireless signal and on a signal power of the optical wireless signal at a receiver.

4. The optical wireless apparatus according to claim 3, wherein the noise ratio describes a signal-to-noise ratio, SNR, or a carrier-to-noise ratio, CNR.

5. The optical wireless apparatus according to claim 1, wherein the optical wireless signal is a first optical wireless signal that is emitted in a first transmission interval,
wherein the optical wireless apparatus is configured to determine, for transmitting a second optical wireless signal in a later second transmission interval, that a channel attenuation has increased compared to the first transmission interval and to increase the modulation and/or to reduce the operating point; and/or
wherein the optical wireless apparatus is configured to determine, for transmitting a second optical wireless signal in a later second transmission interval, that a channel attenuation is reduced compared to the first transmission interval and to reduce the modulation and/or to increase the operating point.

6. The optical wireless apparatus according to claim 5 that is configured to estimate a channel attenuation and that is configured to estimate the non-linear channel distortion based on reference information indicating a noise at a receiver of the optical wireless channel.

7. The optical wireless apparatus according to claim 6 that is configured to estimate the channel estimation based on a signal power at the receiver and a signal power at a transmitter of the optical wireless channel.

8. The optical wireless apparatus according to claim 6 comprising an information memory and/or a channel estimator that is configured to output information indicating a connection between a signal transmitted in the optical wireless channel and the non-linear channel distortions.

9. The optical wireless apparatus according to claim 1, wherein the channel information is based at least partly on a feedback of a receiver of the optical wireless signal with respect to a signal power of the optical wireless signal at the receiver and a noise ratio of the optical wireless signal and the receiver.

10. The optical wireless apparatus according to claim 1 that is configured to transmit the optical wireless signal as a first optical wireless signal via the optical wireless channel and is implemented to receive a second optical wireless signal via the optical wireless channel and is configured to perform channel estimation of the optical wireless channel based on the second optical wireless signal to determine a noise ratio of the second signal.

11. The optical wireless apparatus according to claim 1 that is configured to receive the channel information from a receiver of the optical wireless signal.

12. The optical wireless apparatus according to claim 1 that is configured to adapt the modulation to adapt an amplitude and/or an effective value of an alternating component of the data signal.

13. The optical wireless apparatus according to claim 1 that is configured to adapt the operating point to adapt a direct component of the data signal.

14. The optical wireless apparatus according to claim 1 that is implemented for the adaptation of the modulation of the optical signal source and is configured to increase, by means of adapting the modulation, a noise ratio of a later optical wireless signal that is transmitted in a subsequent transmission interval via the optical wireless channel at the location of a receiver of the optical wireless signal.

15. The optical wireless apparatus according to claim 14, wherein the electronic data source is configured to increase a data rate for the later optical wireless signal based on the increased noise ratio.

16. The optical wireless apparatus according to claim 1 that is implemented for the adaptation of the modulation of the optical signal source and is configured to emit the optical wireless signal based on a first power value of the electronic signal,
wherein the optical wireless apparatus is configured to adapt the modulation of the optical signal source based on channel information, such that the same indicates an increased received power and a reduced noise ratio at the receiver of the optical wireless signal compared to a previous transmission interval, by reducing an alternating component of an electronic signal for a later optical wireless signal towards a second alternating component; and/or
wherein the optical wireless apparatus is configured to adapt the modulation of the optical signal source based on channel information, such that the same indicates a reduced received power and a reduced noise ratio at the receiver of the optical wireless signal compared to a previous transmission interval, by increasing an alternating component of an electronic signal for a later optical wireless signal towards a second alternating component.

17. The optical wireless apparatus according to claim 1 that is implemented for the adaptation of the modulation of the optical signal source,
wherein the apparatus is configured to adapt an operating state of a driver circuit of the electronic signal source to adapt the modulation of the optical signal source.

18. The optical wireless apparatus according to claim 17, wherein the driver circuit comprises an amplifier element that is configured to amplify a processor signal or to convert the same to a current, wherein the optical wireless apparatus is configured to adapt a gain of the amplifier element to adapt the operating state of the driver circuit to adapt the non-linear channel distortions at the optical signal source.

19. The optical wireless apparatus according to claim 18, wherein the driver circuit comprises an adaptable attenuation member to adapt the gain of the amplifier element and/or is configured for active adaptation of a gain factor of the amplifier element.

20. The optical wireless apparatus according to claim 17, wherein the amplifier element is coupled to a resistive circuit that adjusts the gain, wherein the optical wireless apparatus is configured to adjust the gain continuously and/or in a resistance-discrete manner.

21. The optical wireless apparatus according to claim 20, wherein the resistive circuit comprises a plurality of switching states in which different resistances for adjusting the gain are coupled to the amplifier element, wherein the optical wireless apparatus is configured to select and adjust one of the plurality of switching states for changing the control.

22. The optical wireless apparatus according to claim 17, wherein the electronic signal source comprises a signal processor that is configured to provide a processor signal to the driver circuit, wherein the driver circuit is configured to amplify the processor signal, wherein the signal processor is configured to adapt an alternating component of the processor signal to adapt the operating state of the driver circuit.

23. The optical wireless apparatus according to claim 1 that is implemented for the adaptation of the modulation of the optical signal source and that is configured to acquire the channel information as a control signal that shows a dependence on a channel attenuation and on the non-linear channel distortion of the optical wireless channel.

24. The optical wireless apparatus according to claim 1 that is implemented for the adaptation of the modulation of the optical signal source, wherein the channel information is based on a direct component of an optical wireless signal received by a receiver of the optical wireless channel and is associated to an adaptation of an attenuation member of the electronic signal source.

25. The optical wireless apparatus according to claim 1 that is implemented for the adaptation of the modulation of the optical signal source, wherein the channel information is based on an alternating component of an optical wireless signal received by a receiver of the optical wireless channel and is associated with an adaptation of a gain factor of the electronic signal source.

26. The optical wireless apparatus according to claim 1 that is implemented for the adaptation of the modulation of the optical signal source and that comprises an information memory in which different predefined values for the modulation that are associated with different values of the channel distortion are stored and that is configured to acquire and apply an adjustable value for the modulation from the information memory by using the channel information; and/or
that is implemented for the adaptation of the operating point of the optical signal source and that comprises an information memory in which different predefined values for the operating point that are associated with different values of the channel distortion are stored and that is configured to acquire and apply an adjustable value for the operating point from the information memory by using the channel information.

27. The optical wireless apparatus according to claim 1 that is implemented for the adaptation of the modulation of the optical signal source, wherein the optical wireless apparatus is configured to acquire, by the adaptation, a noise component of the non-linear channel distortion of an overall noise at the location of the receiver in an order of an internal receiver noise.

28. The optical wireless apparatus according to claim 1, wherein the optical signal source comprises an optical emitter, in particular a light emitting diode and the operating point corresponds to a direct component of a current consumption of the optical emitter.

29. The optical wireless apparatus according to claim 1 that is implemented for adapting the operating point, wherein the optical wireless apparatus is configured to increase the operating point in a dominant or relevant component of the non-linear channel distortions of an overall noise and high noise ratio of the optical wireless signal at a receiver of the same and a high data rate in the optical wireless signal.

30. The optical wireless apparatus according to claim 1 that is implemented for adapting the operating point, wherein the optical wireless apparatus is configured to reduce the operating point in a non-dominant or less relevant component of the non-linear channel distortions of an overall noise and low noise ratio of the optical wireless signal at a receiver of the same and a high data rate in the optical wireless signal.

31. The optical wireless apparatus according to claim 1, wherein the electronic signal source is configured to adapt a data rate of the data signal based on a noise ratio in previous transmission intervals of transmitted and/or received optical signals.

32. The optical wireless apparatus according to claim 1 that is formed as transceiver and is configured to receive optical wireless signals.

33. The optical wireless apparatus according to claim 1 that is configured to perform the adaptation of the modulation of the optical signal source partly or exclusively outside a transmission interval in which an optical wireless signal is transmitted; and/or
to perform the adaptation of the operating point of the optical signal source partly or exclusively outside a transmission interval in which an optical wireless signal is transmitted.

34. The optical wireless apparatus according to claim 1 that is configured to perform the adaptation of the modulation of the optical signal source gradually, wherein a step size is adapted to the optical wireless channel such that non-linear channel distortions in the optical wireless channel occurring due to the change can be neglected; and/or
to perform the adaptation of the operating point of the optical signal source gradually, wherein a step size is adapted to the optical wireless channel such that non-linear channel distortions in the optical wireless channel occurring due to the change can be neglected.

35. The optical wireless apparatus according to claim 1 that is configured to transmit the optical wireless signal as an amplitude-modulated signal or as orthogonal frequency division multiplex signal.

36. The optical wireless apparatus according to claim 1 that is configured to acquire the channel information as an instruction to adapt the modulation or to adjust the operating point and to implement the instruction.

37. An optical wireless network with an optical wireless apparatus according to claim 1 and a receiver for receiving the optical wireless signal.

* * * * *